United States Patent
Raymond et al.

(10) Patent No.: US 7,414,790 B2
(45) Date of Patent: *Aug. 19, 2008

(54) ULTRATHIN LENS ARRAYS FOR VIEWING INTERLACED IMAGES WITH DUAL LENS STRUCTURES

(75) Inventors: Mark A. Raymond, Littleton, CO (US); Howard G. Lange, Mount Prospect, IL (US)

(73) Assignee: Genie Lens Technologies, LLC, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/838,045

(22) Filed: Aug. 13, 2007

(65) Prior Publication Data
US 2008/0112056 A1    May 15, 2008

Related U.S. Application Data

(63) Continuation-in-part of application No. 11/558,523, filed on Nov. 10, 2006, now Pat. No. 7,307,790.

(51) Int. Cl.
G02B 27/10 (2006.01)
G03B 25/02 (2006.01)

(52) U.S. Cl. .................... 359/626; 359/619; 40/454

(58) Field of Classification Search ............... 40/454; 359/454, 455, 469, 619, 626, 628
See application file for complete search history.

(56) References Cited

U.S. PATENT DOCUMENTS

| | | | |
|---|---|---|---|
| 4,387,959 A | 6/1983 | Lange et al. |
| 5,731,899 A | 3/1998 | Meyers |
| 5,842,762 A | 12/1998 | Clarke |
| 5,924,870 A | 7/1999 | Brosh et al. |
| 5,967,032 A | 10/1999 | Bravenec et al. |
| 6,177,953 B1 | 1/2001 | Vachette et al. |
| 6,256,149 B1 | 7/2001 | Rolfe |
| 6,424,467 B1 | 7/2002 | Goggins |
| 6,490,093 B2 | 12/2002 | Guest |
| 6,624,946 B2 | 9/2003 | Franko, Sr. |
| 6,781,761 B2 | 8/2004 | Raymond |

(Continued)

OTHER PUBLICATIONS

Vetro, Anthony, et al., "Coding Approaches for End-to-End 3D TV Systems," Mitsubishi Electric Research Laboratories, Dec. 2004, TR2004-137.

*Primary Examiner*—David N Spector
(74) *Attorney, Agent, or Firm*—Marsh Fischmann & Breyfogle LLP; Kent A. Lembke

(57) ABSTRACT

An assembly for displaying an interlaced image. The assembly includes an interlaced image, which may be digitally or web printed for example, with sets of elongate image elements or slices. A lens arrays is provided with a first side proximate the interlaced image such as a planar surface and a second side distal the image with numerous lens sets. Each of the lens sets is paired with one of the sets of the image elements and includes a number of linear or elongate lenses that are each mapped to one to three image elements. The lenses are each configured to focus light from the subset of image elements to a viewer along a focus direction or line. The lenses are configured to provide a lens-specific viewing angle with a focus line, and the focus line to the paired image element subset differs from other lenses or is unique.

22 Claims, 16 Drawing Sheets

U.S. PATENT DOCUMENTS

| | | |
|---|---|---|
| 6,795,250 B2 | 9/2004 | Johnson et al. |
| 6,831,787 B1 | 12/2004 | Scarbrough et al. |
| 6,943,953 B2 | 9/2005 | Raymond |
| 7,002,748 B1 | 2/2006 | Conley et al. |
| 7,019,865 B2 | 3/2006 | Nims et al. |
| 7,046,271 B2 | 5/2006 | Doerfel et al. |
| 7,075,725 B2 | 7/2006 | Tomczyk |
| 7,307,790 B1 * | 12/2007 | Raymond et al. ............ 359/626 |
| 7,359,120 B1 * | 4/2008 | Raymond et al. ............ 359/626 |
| 2004/0263885 A1 | 12/2004 | Tomczyk |
| 2005/0180006 A1 | 8/2005 | Mendoza |
| 2005/0286134 A1 | 12/2005 | Goggins |
| 2006/0082877 A1 | 4/2006 | Wang |
| 2006/0146410 A1 | 7/2006 | Krause |
| 2008/0019029 A1 * | 1/2008 | Raymond et al. ............ 359/893 |
| 2008/0080058 A1 * | 4/2008 | Raymond ................... 359/627 |

* cited by examiner

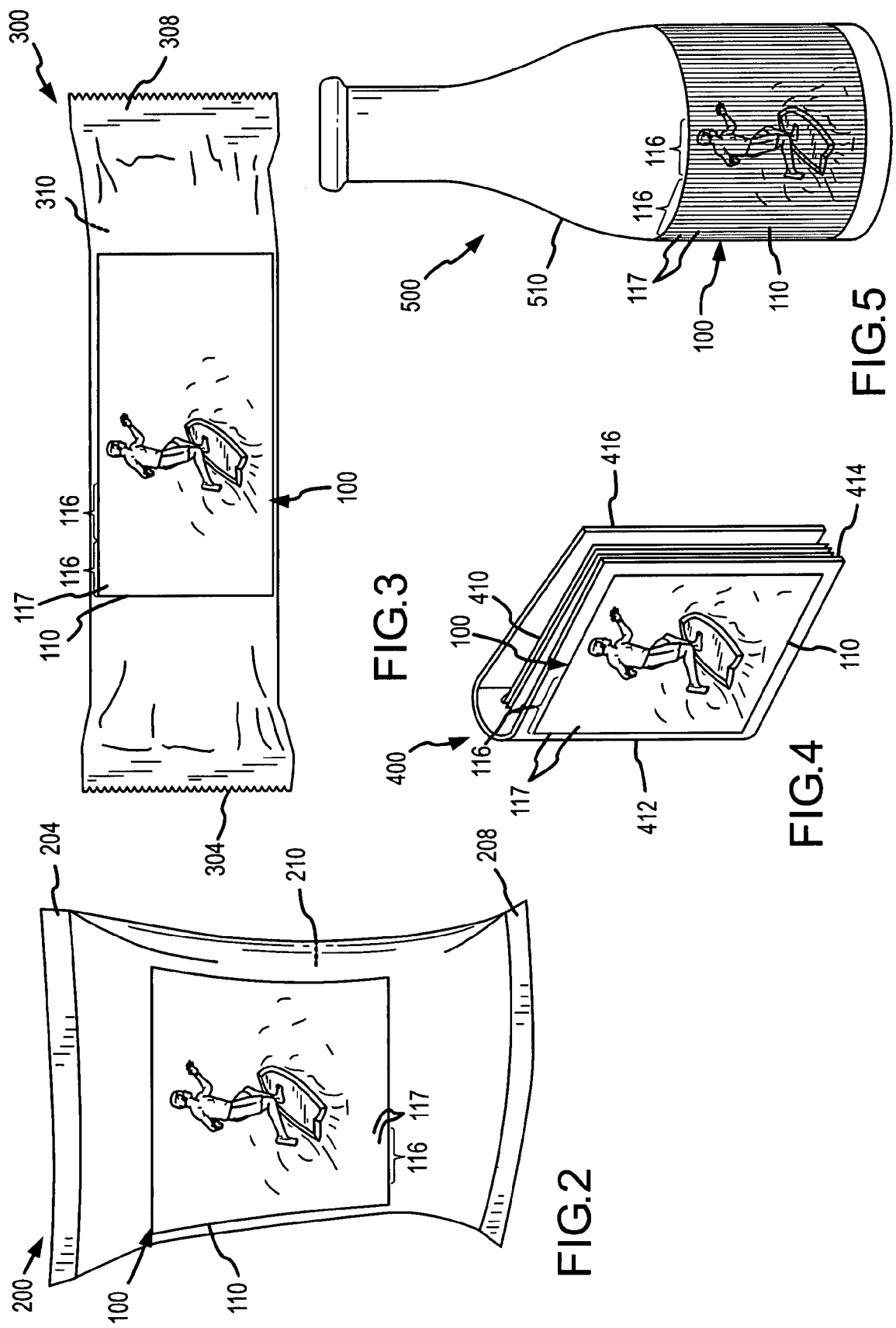

ULTRATHIN LENS ARRAYS FOR VIEWING INTERLACED IMAGES WITH DUAL LENS STRUCTURES

CROSS-REFERENCE TO RELATED APPLICATIONS

This application is a continuation-in-part of U.S. patent application Ser. No. 11/558,523 filed Nov. 10, 2006, now U.S. Pat. No. 7,307,790, which is incorporated herein by reference in its entirety.

BACKGROUND OF THE INVENTION

1. Field of the Invention

The present invention relates, in general, to lens arrays and devices for use in viewing or displaying images that are interlaced to display animated, three-dimensional (3D), and other images, and, more particularly, to very thin lens arrays, as well as products incorporating such lens arrays and methods of fabricating such lens arrays, that include numerous, repeating sets of lenses or lens microstructures that are specialty configured for viewing an interlaced image by pairing each lens in the set or microstructure with only one of (or a smaller subset of) the interlaced image elements or slices.

2. Relevant Background

Elaborate graphics can be produced with lenticular graphic labels to provide three-dimensional (3D) and animated imagery such as a short clip of a movie. For example, lenticular lens material is used in the packaging industry for creating promotional material with appealing graphics and typically involves producing a sheet of lenticular lens material and adhesively attaching the lenticular lens material to a separately produced object for display. The production of lenticular lenses is well known and described in detail in a number of U.S. patents, including U.S. Pat. No. 5,967,032 to Bravenec et al. and U.S. Pat. No. 6,781,761 to Raymond.

In general, the production process includes selecting segments from visual images to create a desired visual effect, slicing each segment into a predefined number of slices or elements (such as 10 to 30 or more slices per segment), and interlacing the segments and their slices (i.e., planning the layout of the numerous images). Lenticular lenses or lens sheets are then mapped to the interlaced or planned segments, and the lenticular lenses are fabricated according to this mapping. The lenticular lenses generally include a transparent web that has a flat side or layer and a side with optical ridges and grooves formed by linear or elongated lenticules (i.e., lenses) arranged side-by-side with the lenticules or optical ridges extending parallel to each other over the length of the transparent web. To provide the unique visual effects, ink (e.g., four color ink) is applied to or printed directly on the flat side of the transparent web to form a thin ink layer, which is then viewable through the transparent web of optical ridges.

Each lenticule or lens of the lenticular layer is paired or mapped to a fairly large set or number of the interlaced image slices or elements. For example, one lenticule may be paired with 10 to 30 or more interlaced image slices or elements associated with the image segments, and generally only one of the slices is visible through the lenticule at a time based on the position of the lenticule relative to a viewer's eye. In other words, the animation, 3D, or other graphic effect is achieved by moving the lenticule or the viewer's position to sequentially view each of the interlaced image slices under the lenticule and allow a viewer to see each segment of the image by combining the slices viewed from all the lenticules.

In producing conventional lenticular lens material, it is desirable to use as little material as possible, i.e., to produce effective lenticules or lenticular lens arrays with as thin as web material as possible. Decreasing lens thickness is also desirable to facilitate fabrication using techniques such as web printing that are very difficult or impractical with thicker lens materials. Thin lenticular lens material is desired to save on material costs and to provide a relatively flexible lens material or substrate that can be easily applied to products and product containers, such as in a label that can be attached to a box or to a bottle as part of a wraparound label or on a cup to provide desirable visual effects. To make lenticular lens materials thinner, the whole structure must be properly scaled downward together. In other words, the lenticules and the printed interlaced image must be shrunk or made smaller together to allow proper mapping of the image slices to the lenticules.

However, such shrinking of the lenticules has proven very difficult with limitations associated with printing the interlaced images often preventing the lens layer or web being made very thin. As noted above, all the interlaced slices for each segment are placed underneath a single lenticule such that numerous slices have to be printed with very little width to be mapped to the lenticules width or pitch. However, the printing can presently only be done with a limited degree of resolution, and this forces the lenticular lens material due to printing practicalities and resolution to be provided in coarser frequencies ranging from about 10 lenticules per inch (LPI) to about 200 LPI. With coarser lens arrays (i.e., with lower frequency or LPI), the printing can be accomplished more easily and mapping to lenticules of the image slices achieved more accurately. However, coarser lens arrays with frequencies of 10 to 30 LPI tend to be very thick because general physics or optical rules for focusing with conventional lenticular material require that more lens thickness or more lens material be provided to achieve effective focusing. For example, a 15 LPI lenticular lens array with a fairly common viewing angle (such as a 22-degree viewing angle) may be mapped to an interlaced image that is printed or provided directly behind the lenticular lens array, with each of the lenticules in the lens array being mapped to or paired with all image slices of a paired segment of the interlaced image. If the lens array is formed from acrylic, the lens array would need to be about ⅜-inch thick to enable the lenticules to properly focus on the paired image slices. Conversely, the frequency of the lenticular lens array may be increased (i.e., a finer lens array may be used). However, existing limitations on printing have resulted in the thinnest lenticular lens arrays being at least about 15 to 30 mils thick, and the mapping accuracy required at these lower thicknesses and higher lenticule frequencies often results in lower quality imaging results and increased fabrication or printing costs.

There remains a need for a lens array or structure that provides an alternative to conventional lenticular lens arrays so that lens arrays or structures can be provided with less thickness and with enhanced mapping of interlaced image slices or elements to the lens array for improved visual effects. Preferably, such a new lens array would be easy and inexpensive to fabricate, would be well suited for fabrication with thicknesses less than presently achievable with lenticular lens materials (e.g., less than about 15 to 20 mils), and would still be useful for providing desired viewing angles (e.g., 20 to 40 degree viewing angles or the like) to view conventional interlaced images (e.g., images interlaced as for use with conventional lenticular material to achieve 3D, animation, or other visual effects).

SUMMARY OF THE INVENTION

The present invention addresses the above problems by using lens substrates or arrays formed to include numerous lens microstructures or lens sets. Each of these lens microstructures can be used to provide the functionality of a much thicker lenticule or lens of conventional lenticular material as each of the lens microstructures is paired to a set of interlaced image elements or slices, which may be printed digitally, printed with offset printing, printed using web printing, or the like. The lenses of the lens microstructure are each used to focus onto or from a small subset of the slices in a paired set rather than focusing on all of the slices of the set as is required of a lenticule in conventional lenticular technology. Further, the lenses of the lens set or microstructure are each uniquely configured (e.g., with a differing cross sectional shape) to provide its own main viewing direction or focus line/direction such that each lens in a lens microstructure displays the small subset of images (e.g., 1 to 3 images) to which it is mapped and with a lens-specific viewing angle or angular distribution. In practice, the lens microstructures have an overall viewing angle that is generally the combination of the angular distribution of each lens of the lens microstructure with the focus lines or directions of each lens selected such that only select ones of the image elements or slices are displayed or visible as a viewer's line of sight moves through the overall viewing angle. The lens arrays may be significantly thinner than possible or practical with convention lenticular material (e.g., 50 to 90 percent or more reduction in lens thickness), which allows the "paper thin" arrays to be applied to or provided integrally in numerous product surfaces such as in printed labels, attached decals or labels, book jackets, magazine covers, wraparound labels, and many other print and packaging applications.

An ongoing problem with traditional lenticular lens material used to focus on and magnify printed interlaced images is that the lens arrays or material had to be relatively thick to be effective. Lenticular arrays need to be manufactured to follow optical laws or laws of physics such as Snell's Law such that the focus of these lenticules is determined by the radius of the lens and index of refraction of the lenticular material combined with other parameters including frequency and array thickness. A general problem with lenticular arrays is that in order to decrease the thickness of the lens or associated array thickness to lower costs and to enhance its application (e.g., thick plastic lens material does not process well, is difficult or impossible to bend, and is hard to wrap on curved surfaces), the frequency of the lenticules in the array must be increased (e.g., the lenticules per inch or LPI must be increased). As the frequency is increased, the thickness of the lens or lens array may be decreased, but, unfortunately, the quality of the displayed image or visual effect generally also decreases. More specifically, as the lenticule frequency is increased and the thickness is decreased, the ability to print high quality interlaced images to produce 3D and animation becomes exponentially more difficult because the slices or image elements have to be provided at very fine widths, i.e., at high frequencies. For example, if it were desired to use a 12-mil thick lenticular lens array, the lenticules would have to be provided at a very high frequency (such as about 167 LPI) to produce a quality display and the image elements may need to provide sets of twelve images under each lenticule. As can be appreciated, printing an interlaced image for such a lens array becomes quite difficult and cannot be done with some printing techniques such as roll form as the image elements have widths of 0.000139 inches ($\frac{1}{167}$-inch divided by 12), which is impractical for most printing applications particularly a CMYK format in which all colors must register accurately in this small space or slice width.

With lens arrays using the lens microstructures or lens sets of the invention, the lens microstructures can be configured so as to provide the function provided by a thick conventional lenticule by using a number of thin lenses that are individually configured to focus on a subset of image slices (such as 1 to 3 slices rather than a whole set of 4 to 12 or more slices). The lens arrays can be imprinted with the lens microstructures on a thin film at a very high rate of speed. In one example, a high quality image display assembly is achieved with a 3-mil thick lens array having lens sets or microstructures on one side provided at 40 lens sets per inch (LPI) and an interlaced image on the other side. The interlaced image can be printed rapidly such as at up to 2,000 feet per minute or faster on a web press or similar device. To achieve a similar display capability with a conventional lenticular lens array may require a frequency of 40 LPI and a thickness of about 80 mils or more. From these few examples, it can be seen that the use of lens microstructures to generate a lens array provides a significant decrease in material costs, allows very thin lens arrays or substrates to be used in numerous applications for which conventional lenticular material is not practical, and greatly simplifies manufacturing by, for example, allowing printing of interlaced images at lower frequency or fineness.

More particularly, a lens microstructure is provided for use in lens arrays for displaying interlaced images. The lens microstructure includes a substrate or layer of material that is transparent or at least translucent to light. The structure further includes a linear or elongated center lens on a lens side of the substrate. First and second sets of linear or elongated side lenses are positioned adjacent the center lens to extend parallel to the center lens. Each of the lenses is configured to provide a differing or unique focus direction or focus line such that the lens microstructure has an overall viewing angle that is a combination of an angular distribution of the center lens and angular distributions from each of the sides lenses (e.g., the focus of the structure steps out from the center lens with each side lens). In some embodiments, each of the angular distributions differs but in some cases the angular distributions are substantially equivalent across the lens microstructure (such as a value from the range of about 1 to 10 degrees). In some embodiments, an odd number of lenses are provided in the lens microstructure with an equal number provided in each side set, and further, the cross sectional shape of the first side set is preferably a mirror or reverse image of the second side set. The thickness of the substrate may vary, e.g., with each successive lens from the center lenses being slightly thicker, or the thickness of the substrate as measured at the peak or thickest part of each lens may be kept substantially constant such as less than 15 mils and in some cases 10 to 3 mils or less. The lens microstructure is configured for focusing on one set of slices in the interlaced image such as a segment set and each of the lenses preferably focuses on a small subset such as 1 to 3 slices that may generally be positioned beneath or adjacent the corresponding lens. Lens arrays can readily be formed that include two or more of such lens microstructures to display an interlaced image, and numerous products that include such lens arrays and paired interlaced images may be fabricated to practice the invention.

According to another aspect of the invention, an assembly is provided for displaying an interlaced image. The assembly includes an interlaced image, which may be digitally printed, web printed, or the like, with sets of elongate image elements or slices. A lens array is provided with a first side proximate the interlaced image such as a planar surface and a second side distal the image with a plurality of lens sets. Each of the lens sets is paired with one of the sets of the image elements and includes a number of linear or elongate lenses that are each mapped to a subset of the image elements in a corresponding one of the paired sets. Generally, each of the lenses is configured with a cross sectional shape that allows the lens to focus light from the subset of image elements (e.g., from one of the image elements). Each of the lenses may be configured to provide a lens-specific viewing angle with a particular focus line, and in some preferred embodiments, the focus lines to the paired image element subset is chosen to differ from other lenses (e.g., each lens has a unique focus direction such that the viewing angles are additive to provide an overall viewing angle for the lens set). The interlace image may be printed directly onto the first side of the lens array (with or without a primer first being applied) or an adhesive layer may be used to attach a separate substrate or sheet with the image to the first side of the lens array. In some cases, each of the lens sets includes an odd number of lenses (e.g., 5 to 21 or more lenses), and the lens sets may be provided at a frequency in the lens array from 5 to 75 lens sets per inch with a typical embodiment using a frequency of 10 to 30 lens sets per inch, with the particular frequency being selected to suit the interlaced image being displayed. An even number of lenses could be used to practice the invention. In this case, the sublenticules or lens on either side of a center line of the lens set could have distribution angles of plus/minus 2 degrees for example, but, it will be understood that this example does not need to be explained in detail as it is nearly equivalent to the case of a lens or sublenticule provided on such a center line of a lens set.

According to another aspect of the invention, an image display apparatus is provided that includes an interlaced image made up of a plurality of image elements each having a particular or predefined width. A lens substrate is provided in the display apparatus with a planar side positioned proximate to the interlaced image (e.g., the image may be printed on the planar side or attached with a transparent adhesive). The lens substrate includes a lens side distal to opposite the planar side. The lens side includes numerous lens microstructures that are each made up of a plurality of lenses. Each of these lenses is paired or mapped to one of the image elements so as to focus light passing through the lens substrate to a width of about the width of one of the image elements and to direct the light onto the paired one of the image elements (e.g. each lens in a lens microstructure is used to display one of the image elements in the interlaced image rather than a larger set of such image elements). The image elements are grouped into segment sets including a number of the image elements, and the lens microstructures each have the same cross sectional shape that defines the shape of each lens in the microstructure, with the cross sectional shape chosen to map each lens with one of the image elements. In some embodiments, an odd number of lenses are provided in each of the lens structures such as by providing a center lens with a particular focusing direction (e.g., perpendicular to the planar side of the lens substrate) and side lenses extending from both sides of the center lens. The center and side lenses each have unique or distinct focusing direction or focal lines that are selected such that the angular distributions of all the lenses are generally additive or combinable to define an overall viewing angle (e.g., 20 to 45 degrees or another viewing angle useful for displaying interlaced images) for the lens microstructure.

According to still another aspect of the invention a display assembly is provided that utilizes the concept of dual lens structures to achieve enhanced brightness levels and to control mixing of reflected images. The assembly includes an interlaced image including sets of elongated image elements or interlaces. A lens array is provided with a first side proximate to the interlaced image and a second side including a plurality of lens sets or microstructures. Each of the lens sets is paired with one of the sets of image elements and each of the lens sets includes a plurality of elongate lenses or sublenticules that are each mapped to one or more of the image elements. Adjacent ones of the lenses in each lens set are paired to form a plurality of dual lens structures, with a first or left lens in each dual lens structure distributing reflected light from the paired image(s) in a first viewing or direction angle and a second or right lens distributing light in a second viewing or direction angle that differs from the first viewing angle. For example, the left and right lenses may be sloped to have viewing angles of equal magnitude but opposite sign or direction relative to a plane passing through the dual lens structure (e.g., one angle may be negative and the other positive or vice versa).

The magnitude of the viewing angles may be the same within a dual lens structure but, typically, the magnitude will differ for at least some of the dual lens structures. In this manner, a lens set with two or more dual lens structures will be able to display four or more image elements (unless there is repeating or duplication of the image elements). In some embodiment, at least two of the dual lens structures are formed with similar or even identical cross sectional shapes such that the lenses of the structures provide similar or identical viewing angles. In such embodiments, the interlaced image includes image elements that are duplicated or repeated and duplicate or equivalent content interlaces or image elements are placed under similarly shaped ones of the lenses (i.e., under dual lens structures having like viewing angles). The lens array may have a thickness of less than about 15 mils and often less than about 10 mils such as about 2 to 5 mils while the lens sets may have a pitch of less than about 20 mils such as 7 to 10 mils or the like. In some embodiments, dual lens structures with larger magnitude viewing angles are provided as the outer or exterior structures within the lens set, and if the interlaced image includes image elements that are to be viewed in a particular sequence, the image elements are ordered in the image set with the first to be viewed under the lenses from the largest negative viewing angles to the largest positive viewing angles (with any duplicated images being placed under lenses with like viewing angles).

BRIEF DESCRIPTION OF THE DRAWINGS

FIGS. 2-5 illustrate representative products that are shown to include the image display assembly of FIG. 1A or FIG. 1B as a label/decal or more integral part of a product sidewall;

DETAILED DESCRIPTION OF THE PREFERRED EMBODIMENTS

Figure 1A:
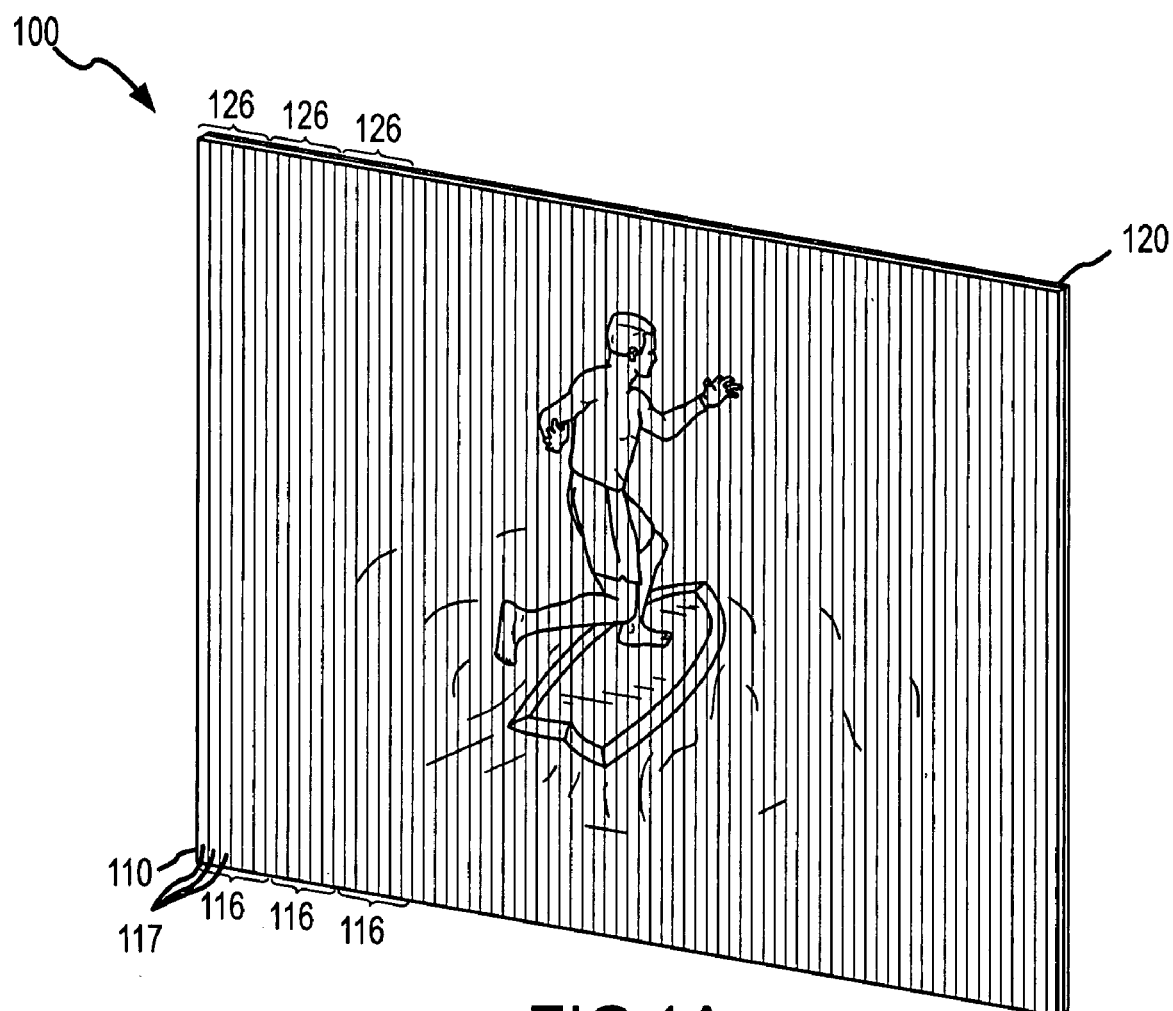
FIG. 1A is a perspective view of an image display assembly or apparatus such as a label, decal, or the like that may be applied to another structure or used as a standalone device, with the imagery assembly including a lens array and an interlaced image according to the present invention.

Briefly, the present invention is directed to lens arrays that can be used to reduce or even replace the use of conventional lenticular material. With conventional lenticular material, numerous elongated or linear lenticules or lenses are provided in a clear or translucent web or layers. Each lenticule is used to provide a viewing angle (e.g., 15 to 40 degrees or the like and more typically about 20 to 35 degrees) through which a plurality of interlaced slices of an image segment is visible to a viewer. For example, an interlaced image may be printed on the smooth side of the lenticular material web with the set of slices, which may number 5 to 20 or more, for a segment of the image being mapped to a particular lenticule such that the slices can be viewed separately as the material or the viewer's line of sight is moved across the viewing angle. The interlaced image with its interlaced image slices or elements can in this way be viewed to achieve visual effects such as 3D, animation, and the like. A significant problem with conventional lenticular material is that the lenticule (or the lenticular material) must be relatively thick to effectively focus onto the numerous image slices paired with the lenticule. For example, the thinnest conventional lenticular material used today is at least about 15 mils but the printing and mapping requirements generally have led the printing and packaging industry to use lenticular material or lenticules that are at least about 20 mils thick.

In contrast, the lens arrays of the present invention can be thought of as replacing each of these conventional lenticules with a lens set or lens microstructure. The lens set is configured with a number of lenses or "sublenticules" that are each paired with a smaller subset of slices of a segment. For example, a conventional lenticule may be used to provide a viewing angle to selectively view 15 image slices of a segment of an interlaced image. A lens set or lens microstructure of a lens array of the invention would, instead, use lenses or sublenticules that are each mapped or paired with one of the image slices instead of to all 15 image slices or elements. Each of the lenses of the lens set is configured to provide a "step" or portion of the viewing angle, e.g., if the viewing angle is 30 degrees in the 15-lens example each lens would provide a step of about 2 degrees such that the lens set provided the same or similar viewing angle as a conventional lenticule. However, the thickness of the lens set can be significantly less than that of a conventional lenticule to provide the same or similar effect. For example, it is likely that lens arrays may be effective with thicknesses of less than about 15 mils and even less than about 3 mils (while, of course, lens assemblies with thicknesses greater than 15 mils may be used in some applications).

The lens arrays of the present invention would include a number of the lens sets or lens microstructures similar in number to the lenticules of lenticular material, and the lens sets may be defined by frequency similar to lenticules at a particular LPI (e.g., lens sets per inch or lenticules per inch) and the overall pitch of the lens set or lens microstructure is often the same or similar to the pitch of the lenticule it is used to replace. An interlaced image may be produced for a conventional lenticular material such as for a 20 LPI lenticular lens material, and the lens sets may be provided in a lens array with 20 lens sets per inch or at 20 LPI. The lens arrays produced according to the invention are typically paired with an interlaced image that may be printed onto the smooth side of the lens array (which may be formed from plastic, glass, or other transparent to translucent material) or may be applied to the back or smooth side of the lens array with an adhesive (e.g., with the printed interlaced image provided on a substrate such as plastic, paper, or the like). The combination of the interlaced image and the lens array forms an image display assembly, device, or product of the invention that produces high quality 3D, animation, and other visual effects but with a 50 to 90 percent or more reduction in thickness (i.e., with ultrathin lens arrays).

FIG. 1A, illustrates an exemplary interlaced image display assembly 100 of the present invention. The assembly 100 may take the form of a label, a decal a poster, a billboard, a book cover, a media insert, printing, or label (e.g., for CDs, DVDs, software, or other media product), a card (e.g., a debit, credit, smart, security, or other card), or nearly any product or device that is used to display images. The assembly 100 is shown to include a lens array 110 that is mated with an interlaced image 120 such as by the interlaced image 120 being printed onto a smooth or back surface of the assembly 100 distal or opposite the lens surface of the array 110. The lens "array" 110 of the invention is intended to be construed broadly to be a layer/sheet or layers/sheets of a material such as plastic, glass, ceramic, or other transparent to translucent material along with a lens surface formed on one side and a smooth or textured side opposite the lens surface.

The lens array 110 includes a number of lens sets or lens microstructures 116 that extend across one of the surfaces of the lens array 110 (or may be provided in a select portion). The lens sets 116 illustrated each include a number or plurality of linear or elongated lenses or lens elements 117. The lenses 117 and useful configurations for the lens sets or microstructures 116 are explained in more detail with reference to FIGS. 6-12. The interlaced image 120 is preferably printed onto or applied to the lens array 110 such that its sets of image slices 126 are mapped or paired to the lens sets 116, e.g., with 1 to 3 or more of the slices being positioned underneath or opposite one of the linear lenses 117. Note, the width of the lenses 117 and image slices 126 is shown to be much larger (or not to scale) in FIG. 1A as the lenses 117 often will be less than 100 microns and more typically less than about 50 microns. As explained further below, each of the lenses 117 in the lens sets 116 focuses a viewer's line of sight onto the paired subset of slices from the full set of slices 126 from an image segment (i.e., not on all slices in the set 126), and such focusing will combine with the other lenses 117 of the lens set 116 to provide a predefined viewing angle for viewing the set of image slices 126 (e.g., 15 to 45 degrees or another useful viewing angle).

Figure 1B:
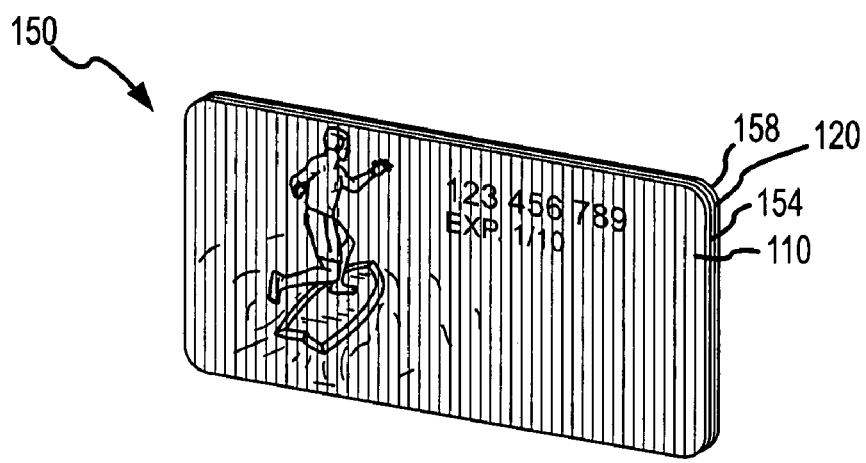
FIG. 1B is a perspective view of an image display assembly similar to FIG. 1A but further including an adhesive layer between the lens array and the interlaced image and a substrate upon which the image is printed or provided, with the adhesive layer being provided on either or both the lens array or the interlaced image.

Rather than printing directly on the lens array 110, it may be desirable to form image display assemblies by applying an interlaced image on a substrate or with a plastic, paper, or other backer or liner onto the lens array 110. FIG. 1B illustrates such an image display assembly 150 of the present invention. In the assembly 150, the lens array 110, which is configured with lens sets 116, is bonded to a substrate 158 such as a paper, plastic, or the like sheet. The bonding is achieved with an adhesive 154 that may be applied to either the lens array 110 or to the substrate 158. For example, thermal laminating processes may be used to form the assembly 150 with the adhesive 154 being a layer of thermally activated adhesive applied to either the lens array 110 or more commonly to the substrate 158. The adhesive 154 is activated by heat and the array 110 and substrate 158 are mated together with pressure such as that applied by a conventional nip roller or other pressure-applying machinery. The interlaced image 120 is applied or printed onto the substrate 158 prior to the bonding process and the bonding is performed to carefully map or pair the sets of image slices or interlaces with the lens sets 116 and the lenses 117 in each set 116. The assembly 150 may be a standalone product such as a smart or credit/debit card or may be applied to another structure as a label, cover, decal, or the like.

FIGS. 2-5 provide additional examples of products in which the image display assemblies 100 (or 150) may be used to practice the invention. FIG. 2 illustrates the use of the display assembly 100 provided on a sidewall 210 of a package 200 between sealed ends 204, 208. For example, the package 200 may be a foil snack bag or a plastic or paper bag used to package food, retail products, or the like. The assembly 100 may be applied as a decal or label to the sidewall 210 or be provided as an integral portion of the sidewall 210. FIG. 3 illustrates a similar packaging 300 for a retail product such as a food product. A display assembly 100 is applied to or provided as an integral portion of the sidewall 310 between sealed ends 304, 308, and the sidewall 310 may be formed of a metallic foil, plastic, paper, or the like as is commonly used in the packaging industry. FIG. 4 illustrates a book, notebook, magazine, or the like 400 with pages 410 enclosed or bound to cover 412 with front and back members 414, 416. The display device or assembly 100 with the lens array 110 and interlaced image is attached to the cover 412 on one or both members 414, 416 (e.g., front and back covers of a book, book jacket, magazine cover, notebook, or the like) or formed as part of the cover 412 (e.g., the lens array 110 may be provided as part of the process to form a notebook cover or book jacket or the like). FIG. 5 illustrates container 500 (shown as a bottle but could be a can, jar, jug, or any other container) with a sidewall 510, and a lens assembly 100 is attached to the container sidewall 510 such that the interlaced image is visible through the lens array 110 with its lenses provided in lens sets or lens microstructures 116. As discussed below, the lens assemblies 100, 150 are often particularly useful in packaging or products such as those shown in FIGS. 1A-5 because the overall thickness can be controlled to provide viewing of an interlaced image with an ultrathin lens array 110 (e.g., less than about 15 mils and, in some embodiments, a thickness selected from the range of about 10 mils to about 3 mils or less).

Figure 6:
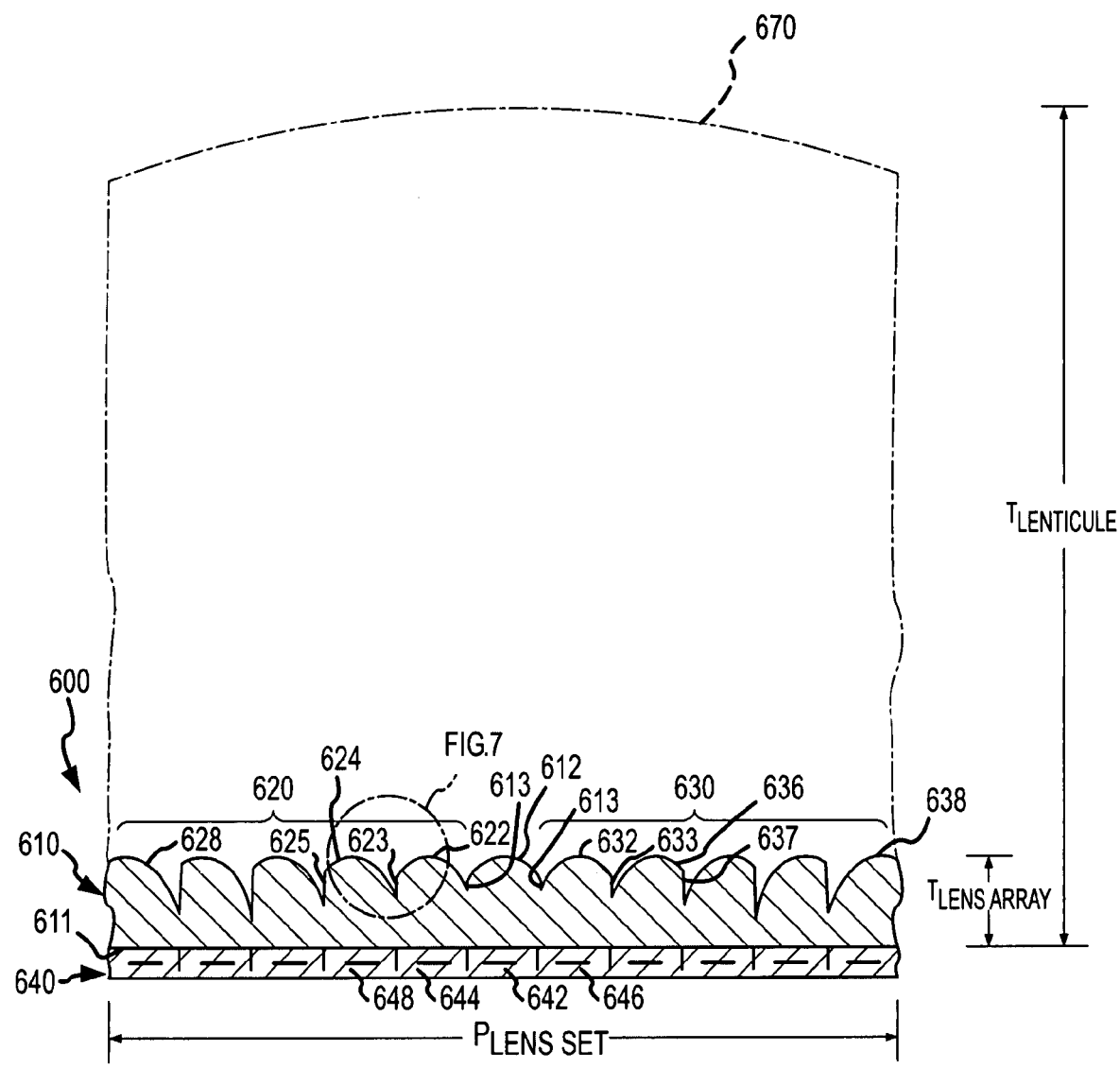
FIG. 6 illustrates a cross section of one embodiment of a portion of an image display device showing a lens microstructure or lens set that may be used in a lens array provided in the image display device of the invention, with the illustrated embodiment using eleven lenses or micro lenses in the lens set or microstructure as a representative, but not limiting, example.

FIG. 6 illustrates a portion of an interlaced image display assembly 600 according to one embodiment of the invention. The "portion" of the assembly 600 is selected to provide the details or configuration of one exemplary lens microstructure or lens set 610. The assembly 600, as discussed with reference to FIG. 1A, would include a lens array with a plurality of such lens sets 610 that are provided in a side-by-side manner (e.g., with an edge lens of the lens set 610 abutting an edge lens of the next or adjacent lens set(s)). In prior art devices used to view an interlaced image, a lenticule 670 would be provided with a particular thickness $t_{Lenticule}$, and a pitch to focus upon a set of image slices or image elements provided in an interlaced image 640. In contrast, the invention addresses the limitations of such a lenticule 670 by providing a lens set 610 with a separate sublenticule or lens for each interlace or slice in the image 640. This results in a much reduced thickness, $t_{Lens Array}$, for the lens set 610 (and the lens array containing this and other lens sets that are typically configured identically to the lens set 610). The inventors have verified that the lens set or array thickness, $t_{Lens Array}$, may be 50 to 90 percent or less of the thickness, $t_{Lenticule}$, that would be provided for a conventional lenticule 670 that provides the same or similar function as the lens set 610 (although the particular thickness of the lens array 610 is not limiting of the breadth of the invention).

As shown, the display assembly 600 includes a lens set or lens microstructure 610 with a first side or surface including lenses and a second side or surface 611 that may be smooth or textured and upon which a printed image 640, such as an interlaced image, is printed (or applied with an adhesive such as shown in FIG. 1B). Generally, the process of forming the assembly 600 includes using a high or even the highest practical resolution interlaced image 640 that can be printed and designing a lens for inclusion in the lens set 610 for each interlaced image slice or element (or in some cases for 1 to 3 or more slices rather than just one image element). Each lens of the lens set 610 is designed to send light from the paired slice underneath it or adjacent it precisely in a predefined or desired direction (e.g., designed to focus the light reflected from the slice to be directed in a step of a larger viewing angle defined for the lens set 610 or over a small viewing angle that differs but is adjacent or near to adjacent to the next or adjacent lens in the lens set (e.g., a subpart of the viewing angle of the lens set 610)). Such a configuration of the lens set 610 can be seen as a further improvement over a conventional lenticule 670 in that it allows individual adjustment or setting of the angular distribution from the interlaced pattern or image 640. A lens array made of lens sets 610 can be made thin enough to be used as a wrapping material or as thin as paper to be applied to another structure or provided alone whereas conventional lenticules 670 are generally too thick and have more limited uses. Hence the cost of material for a lens array formed from a plurality of lens sets or lens microstructures 610 is a function of the material cost for lenticular material with lenticules 670, which allows the display assembly 600 to be used to meet the large market demand for labels and other thin packaging products that can be used to display interlaced images with motion, 3D, and flash imagery.

The lens set 610 is configured in the illustrated example to include an odd number of lenses (i.e., 11 in this example) with the number of lenses typically selected to match the number of slices of interlaced image 640 that are paired with the lens set 610 such as the number of interlaces provided for each image segment in the image 640. As shown, the lenses of lens set 610 may be thought of as divided into a center lens or lens element 612 and sets of side lenses 620, 630 (e.g., left and right lens sets). The left and right lens sets 620, 630 mirror each other in their configuration. For example, the lens 622 immediately adjacent the center lens 612 in the left lens set 620 is identical in cross sectional shape as the lens 632 immediately adjacent the center lens 612 in the right lens set 630 except that it is the mirror or reverse image.

The lens 612 is configured to focus on a paired slice 642 of the interlaced image 640 through a particular viewing angle, such as a fraction of an overall viewing angle selected for the lens set 610, and in a particular direction, such as when a viewer's line of sight is substantially perpendicular to the image 640 and lens set 610. The left lens set 620 and right lens set 630 each include one or more lenses that are used to view the interlaced image 640 when the line of sight is changed from perpendicular or near perpendicular. Each lens in the sets 620, 630 provides its own step or particular viewing angle that focuses light from interlaces or slices of the interlaced image that are paired with each lens (e.g., a subset of the interlaces such as one slice as shown in FIG. 6). For example, the lens set 610 may be configured to provide an overall viewing angle of about 33 degrees. Each of the lenses in the lens set 610 including the center lens 612 would then be adapted to provide a viewing angle that is a fraction of this overall viewing angle. In one embodiment, the steps are substantially equal but in other embodiments, the steps may differ for at least some of the lenses (e.g., one viewing angle for the center lens 612, one viewing angle or step for the next lens in both directions, one viewing angle or step for the second lens in both direction, and so on or the angles may be varied for only one or more of the lenses or lens pairs with the others using the same step value). In this 33-degree overall viewing angle example, each lens of the lens set 610 may provide an angular step/distribution or have its own viewing angle of about 3 degrees. Further, such angular step or distribution is arranged to have a differing direction than the adjacent lens such that each lens of the lens set provides its own unique viewing angle with a differing viewing direction. In this fashion, the interlaced image 640 is displayed through the lens set 610 with only one of the interlaces or slices being visible or displayed at a time or at a particular line of sight within the overall viewing angle. For example, the image element 642 under or paired with center lens 612 may be displayed at a first position of the assembly 600 or viewer and when the line of sight is changed the image element 644 may be displayed through lens 622 or the image element 646 may be third displayed through lens 632.

As discussed above, each of the lenses in the lens set or lens microstructure 610 may be configured individually to focus on a paired image element or slice and/or to direct reflected light from such slice or element in a particular direction and with a particular viewing angle. As shown in the example of FIG. 6, the lens set 610 includes a center lens 612 that is generally symmetric about its center line (or a plane passing through its center). The lenses 622, 632 adjacent and abutting the center lens 612 provide a next step or angular distribution relative to the viewing angle or angular distribution of the center lens 612. For example, the center lens 612 may have a viewing angle of 1 to 5 degrees or another value with its center substantially perpendicular to the image slice 642. Then, each of the lenses 622, 632 may provide a small angular step from this central viewing angle to provide two additional viewing angles or angular distributions for light from the image slices 644 and 646 that are positioned underneath or adjacent the lenses 622, 632. In other words, the viewing angle provided by the three lenses 612, 622, 632 may be 9 degrees with each providing a 3 degree step or subpart of the combined viewing angle, and within this combined viewing angle, only one of the slices 642, 644, or 646 may be visible at a time depending upon a viewer's line of sight (although in many cases there may be at least some overlap such that portions of nearby slices may be visible when a dominant or main slice is viewed).

A next step is added or provided by the contribution of lenses 624 and 636 of the left and right side lens sets 620, 630. These lenses 624, 636 provide the same angular step as the lenses 622, 632 or, in some cases, a smaller or larger step. In the above example, each of these lenses 624, 636 may provide another 3 degree step or angular distribution that is directed so as to be additive to the viewing angle provided by lenses 612, 622, 632 such that the overall viewing angle of these 5 lenses is 15 degrees with differing ones of the slices of interlaced image 640 being displayed or, visible based on the line of sight (e.g., slice 648 is paired with lens 624 and is generally only visible when the display assembly 600 is positioned or the viewer moves to an angle that provides a line of sight falling within the 3-degree viewing angle of the lens 624). Such step increases or additions to the overall viewing angle provided by the lens set 610 are continued until outer side lenses 628 and 638 are included, and the assembly 600 is formed by providing additional lens sets configured similarly to lens set 610 to abut or contact the edge lenses 628, 638 (e.g., another lens configured similar to lenses 638, 628, respectively).

Figure 7:
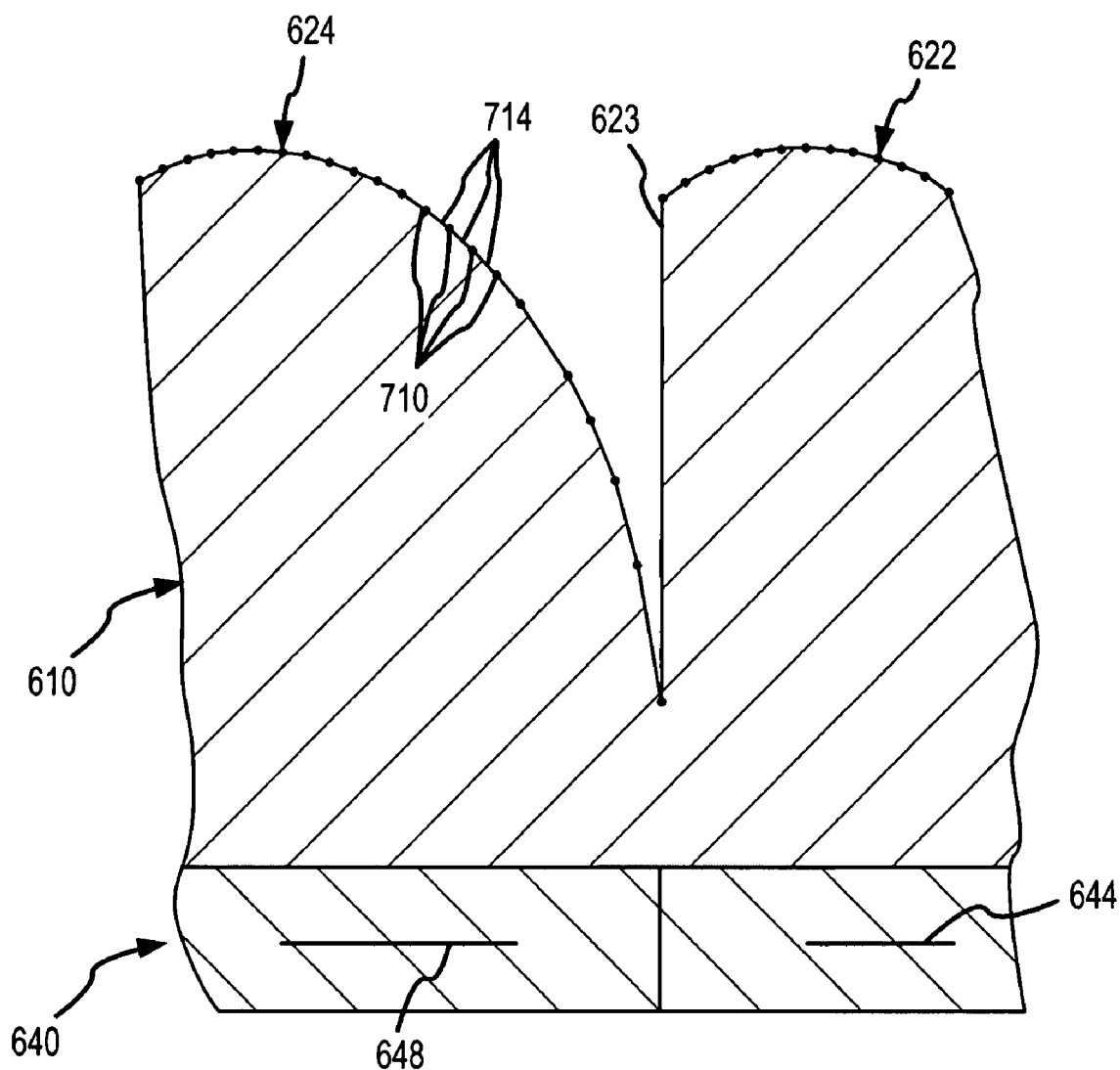
FIG. 7 illustrates an enlarged view of a portion of the image display device of FIG. 6 illustrating in more detail an adjacent pair of lenses or micro lenses of a lens set or microstructure showing a vertical side wall used to join and/or form side lenses of the lens array (with the center lens or microlens typically being symmetric with a continuous curving cross section)
Figure 8:
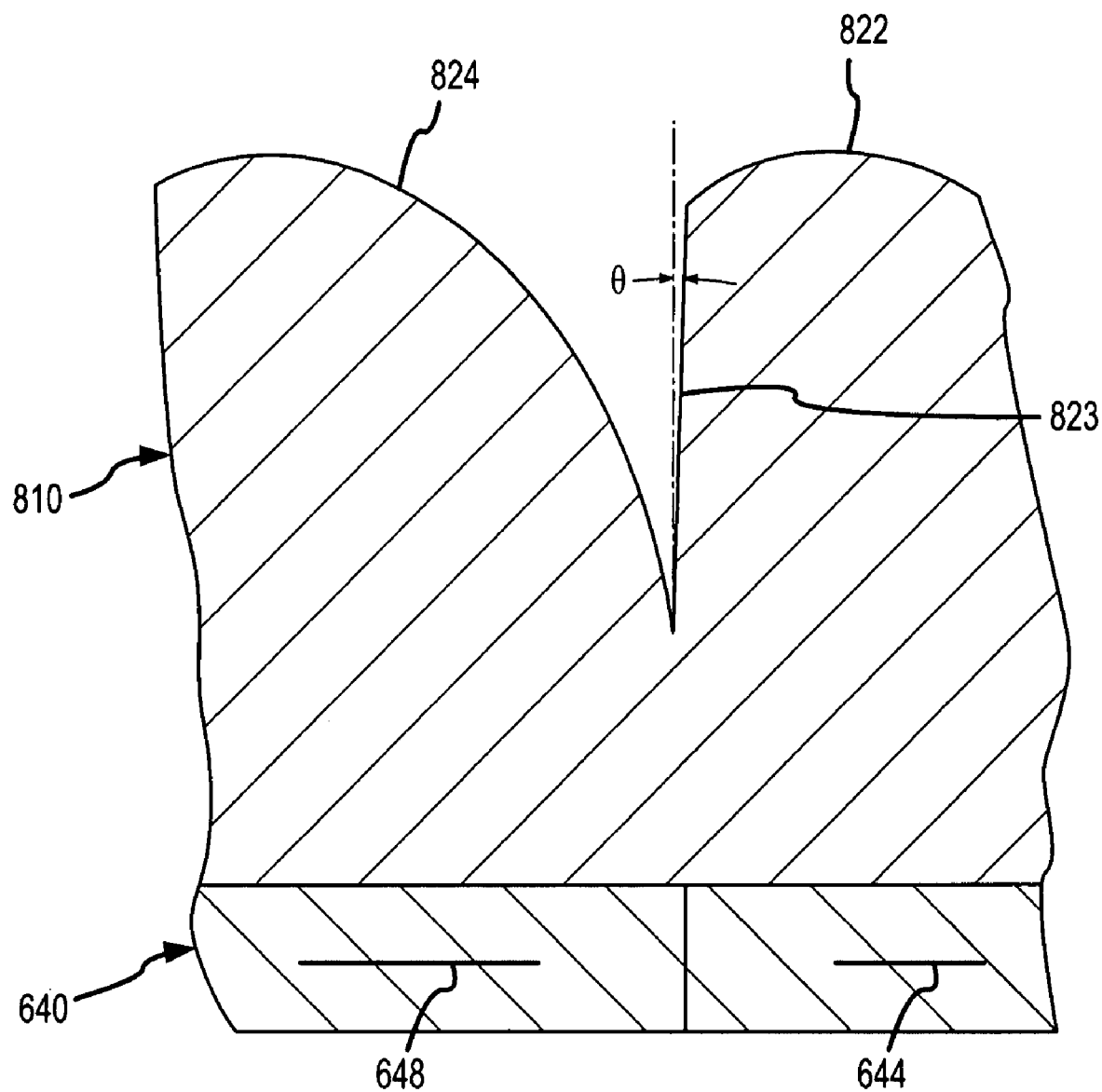
FIG. 8 illustrates an enlarged view of a portion of an image display device, such as the device of FIG. 6, similar to FIG. 7 but showing lenses or micro lenses with a side wall that is not vertical (i.e., off vertical by a relatively small angle to facilitate manufacture of the lens assembly with such lenses in its lens sets)

To maintain the thickness, $t_{Lens\ Array}$, of the lens set 610 at a particular thickness (e.g., less than 15 mils for example) each of the lenses in the side sets 620, 630 is provided with a vertical side edge as shown with edge 623, 625, 633, 637 for side lenses 622, 624, 632, 636. An exemplary vertical side edge 623 is shown in FIG. 7 for lens 622. The center lens 612 typically will also have side walls or edges 613 to maintain the overall thickness of the lens set but these side walls may be very small relative to the edges 623, 625, 633, 637 shown for the other lenses. The side edge 623 is typically vertical such that the edge 623 is substantially parallel to a plane passing through the center of center lens 612. FIG. 8, however, illustrates another embodiment of such side lenses that is configured to facilitate machining or manufacturing of the lens sets.

In this example, a lens set 810 of a lens array or lens layer is shown to include a pair of side lenses 822, 824, and a side edge 823 is shown to join the lens 822 to the adjacent lens 824. The side edge 823 in this case is not vertical but is instead offset or off vertical by an offset angle, θ, that is chosen based on tool or mold design to facilitate manufacture (e.g., all easier removal or control binding of a cutting tool). For example, the offset angle, θ, as measured from a plane parallel to a plane passing through the center of the center lens 612 as shown may be about 1 to 5 degrees or larger and in one case is about 2 degrees.

Now, with reference to FIGS. 6 and 7, it may be useful to explain one useful design process for a constant thickness $t_{Lens\ Array}$, microstructure such as lens set 610. Initially, an overall pitch, $P_{Lens\ Set}$, is selected for the lens set 610. A smaller pitch is generally preferable for obtaining a better image resolution. Next, the number of interlaced images or slices that will be displayed by the lens set 610 is chosen for an intended application, and in some embodiments, the number of slices of sets defines the number of lenses in the lens set 610 (e.g., with each lens being used to focus on a paired one of the image slices or image elements). Typically the number is selected to be an odd number when a one-to-one relation is used for the lenses and image slices, as this allows a single center lens to be used and combined with side sets of lenses having equal numbers of lenses (which can be mirror or reverse images of each other). The pitch and number of lenticules are used to determine the width of each lens in the lens set. When the lenses are substantially equal in width, the lens width is determined by the following equation: Width of Lens=Overall Pitch or $P_{Lens\ set}$/Number of Lenses in Lens Set.

A thickness, $t_{Lens\ Array}$, is then selected such as less than about 15 mils or a greater thickness. In some embodiments, the lens array thickness, $t_{Lens\ Array}$, is selected so it is related to the width of the lenses of the lens set 610 such as to be a little larger or thicker than the width of each of the lenses (but, typically, much smaller than the thickness of a conventional lenticule, $t_{Lenticule}$, used to focus on the interlaced slices previously chosen for the lens set 610). The overall viewing angle is selected and the viewing angle or angular step or difference for each lens is chosen (such as by dividing the overall viewing angle by the number of lenses in the lens set 610), or the individual lens angular steps or distributions may be set and these steps may be combined to define the overall viewing angle for the lens set 610. The values of the viewing angles for each lens and its associated image slice can be individually selected in some embodiments, which is not possible with conventional lenticular structures.

To start the theoretical construction of a lens of the lens set, a ray is traced from each interlace or image element position on the printed substrate 640 associated with the lens set 610 being designed. An initial trace is made to the center of the lens element under construction that has temporarily been set to the desired thickness, $t_{Lens\ Array}$. The slope of the lens element (e.g., of a segment of such lens element between two knots) at that point is adjusted to refract the ray in the desired angular direction for the lens element being generated, e.g., the center lens or lens element 612. Then, a small increment along the direction perpendicular to the lens set 610 axis is made in one direction (e.g., left or right), and the starting point of the next lens segment of the lens element or lens, is the ending point of the previous lens segment. The next or second segment of the lens element being constructed is connected to the end of the first segment and a slope is found for the next or second segment to refract a ray in a desired direction (i.e., onto a particular location where an image slice is anticipated to be positioned). This process is repeated until a left or right boundary of the lens element is reached and the segment-by-segment process is repeated for the segments between knots in the other direction (right or left) until the other boundary of the lens element or lens is reached. If a thickness overage occurs (e.g., over a preset overage limit to achieve a desired lens array thickness), this thickness overage may be subtracted and the process repeated to regenerate the lens element. After completion of this lens element, a ray is sent from the next or adjacent interlaced image slice to the center of a new lens or lens element, e.g. through the center of lens 622 or 632 after completion of lens element 612. The slope of the segment of the next lens element is adjusted so as to send the traced ray in a desired angular direction (e.g., a step from the angular direction of the prior lens element such as a 3 degree or other angular; step value from 90 degrees when the prior lens element is the center lens 612). The surface of the lens set 610 is built up in this stepwise or piecewise fashion until a boundary of the lens set 610 is reached such as at the outer edge of lens 628 or 638 as shown in FIG. 6. Then, the process is repeated in the other direction from the center lens 612 until the other boundary is reached, i.e., the edge of lens 638 for example. Spline fitting may then be used to get as smooth interpolation between the knots used to form each lens element of a lens set. This process of building each lens or lens element of the set by extending calculated slopes over short distances is explained in more detail with reference to the included program listing in the following paragraphs (e.g., the technique of generating the lens elements for each lens set may be thought of as step wise or iteratively constructing each lens element by slopes).

Such an iterative process may result in lenses that increase in thickness from the center lens 612. In some embodiments, a maximum thickness is chosen for the edge lenses 628, 638 and the center lens 612 is provided at a thickness that is lower than this maximum or alternatively, side edges such as edges 623, 625, 633, 637 (and edges 613 on center lens 612) are provided to prevent or control the thickness of lenses from increasing or to retain a constant thickness for the lens set 610. Should any lens or lens element of the lens set 610 include a lens that causes total internal reflection instead of refracting rays in a desired direction, a linear interpolation of the slope may be made to the end of the lens element (such as element 612, 622, 624 or the like) from that lens or lens element. Then, after a lens element has been designed, the process may be restarted by starting a ray at the next interlace or slice position and repeating the process, but designing the lens element for the desired refracted angle for the interlace or slice under consideration.

The lens set 610 of FIG. 6 illustrates a typical design result for the above-described design or configuration process of the invention where the number of interlaced images or slices is eleven and the number of lenses or lens elements in the lens set or lens microstructure 610 is also eleven. FIG. 7 illustrates in detail a lens 624 showing lens surface points 710 plotted or generated based on the ray tracing process described for focusing, light from the slice, or image element 648 of interlaced image 640 using a known width for the lens 624, thickness for the lens array, $t_{Lens\ Array}$, and, therefore, for lens 624, and angular distribution or viewing angle for the lens 624. Also, FIG. 7 shows the connecting lines or line segments 714 generated for connecting a adjacent pairs of the lens surface points 710. In one design process of the invention, after all the lens sets for lens array have been designed, the end points of the segments 714 generated on the lenses are joined by cubic splines or other useful methodology. This allows a precise interpolation procedure to be made so that the surface of the lenses in the lens sets 610 of the lens array can be accurately calculated and plotted or drawn such as to a degree of fineness or accuracy supported by machining processes used to produce the lens array or the tool that is in turn used to form the lens array.

A computer program listing is provided at the end of this description that may be run to perform the design steps described in the preceding paragraphs for a lens set of the present invention such as lens set 610. The computer program may be run on nearly any well known computing device with a processor or CPU, memory, and a monitor, and the program may be implemented with a computer system running the program with code devices for making the computer perform the steps shown in the program listing (not shown with a figure as such a block diagram is not believed necessary to understand the invention). The program listing provides the details of the algorithm that is used for designing or configuring lens set such as lens set 610 as described generally above, but it should be noted that only the code or routines associated with these design steps is provided with supporting subroutines that perform refraction, array handling, and the like being excluded for simplicity and brevity sake as these subroutines are well-known to those skilled in the optical arts. Note, the program listing uses the term "lenticules" in place of "lens" or "lens element" as used in the description of the algorithm provided above but this term is used at least in the listing in its more generic or broad sense as a synonym for lens.

The following is a brief description of the computer program or program listing and provides some important ideas used to generate the lens microstructures of the invention. The entire lens array is typically made up of lens sets (microstructures). The lens sets have individual sub lenticular elements that are to be generated mathematically here or by the algorithms of the computer program. Each sublenticule or lens cress section is built up from short line segments each of which are connected at one end to a previously calculated end. The slope of each line segment is adjusted to refract a ray from the interlace location through the segment in the desired direction. The free end of that segment, which slope was determined, is now the location of the start of the next segment. The initial starting point for each sublenticule is the center of the sublenticule. After all of the points are determined for all the sublenticules, customary cubic spline fitting routines are use to characterize the curves. See, for example, "Numerical Recipes: The Art of Scientific Computing," William H. Press et al., 1986 (e.g., at page 88 and other portions of the text).

The usual methods of program data entry are used to input the following design parameters: pitch of the lens set; number of sublenticules in lens set; angular step of distribution from sublenticule to sublenticule; index of refraction of lenticular material; thickness of lenticules/lens array; slope limit; sidewalls (e.g., yes or no which sets whether the thickness is held constant for the lens/sublenticules in the lens set); and step size of knots in forming each sublenticule. The subroutines for ray refraction are well-known optics procedures and omitted here in the sake of brevity and ease of explanation of the more pertinent features of the invention. Ray intersections of planes and cubic splines curves are also omitted as these are standard routines used in computer graphics programs. The methodology starts at the desired thickness in the center of each sub lenticule and calculates each part of the lenticule first in the negative direction and then restarts in the center and calculates in the positive direction using the endpoints of the sublenticule. The endpoints were previously calculated from the pitch of the lens set and the number of the sublenticules.

In some embodiments, lens arrays of the invention such as a lens array with lens sets or lens microstructures 610 is formed by first machining or generating a mold that is used to form the lenses of the lens sets and lens arrays such as from plastic or the like. The mold may be generated using an air bearing lathe and precise diamond tooling. In one implementation, the lathe and tooling may have a 0.01 micron or similar resolution to insure that a good optical surface is obtained from the mold. A number of materials may be used for the material of the mold such as a soft brass that can be cut by a diamond to form the tool for the plastic (or other transparent to translucent material) lens array. In some cases, the mold or forming tool for the arrays may be made of a material that is relatively soft and that may not be useful for providing many impressions as would be required for high production runs. In these cases, electroforms may be made such as in a two step process to get the correct polarity of the structure. Further, in some cases, the straight side walls of the side lenses such as side wall 623 shown in FIG. 7 may cause difficulties with release (e.g., electroform release from the tool). To reduce this possible issue, the side wall may be designed with an angular offset slope θ, from vertical as shown in FIG. 8 with side wall 823 (e.g., an offset, θ, of 1 to 5 degrees or more).

Figure 9:
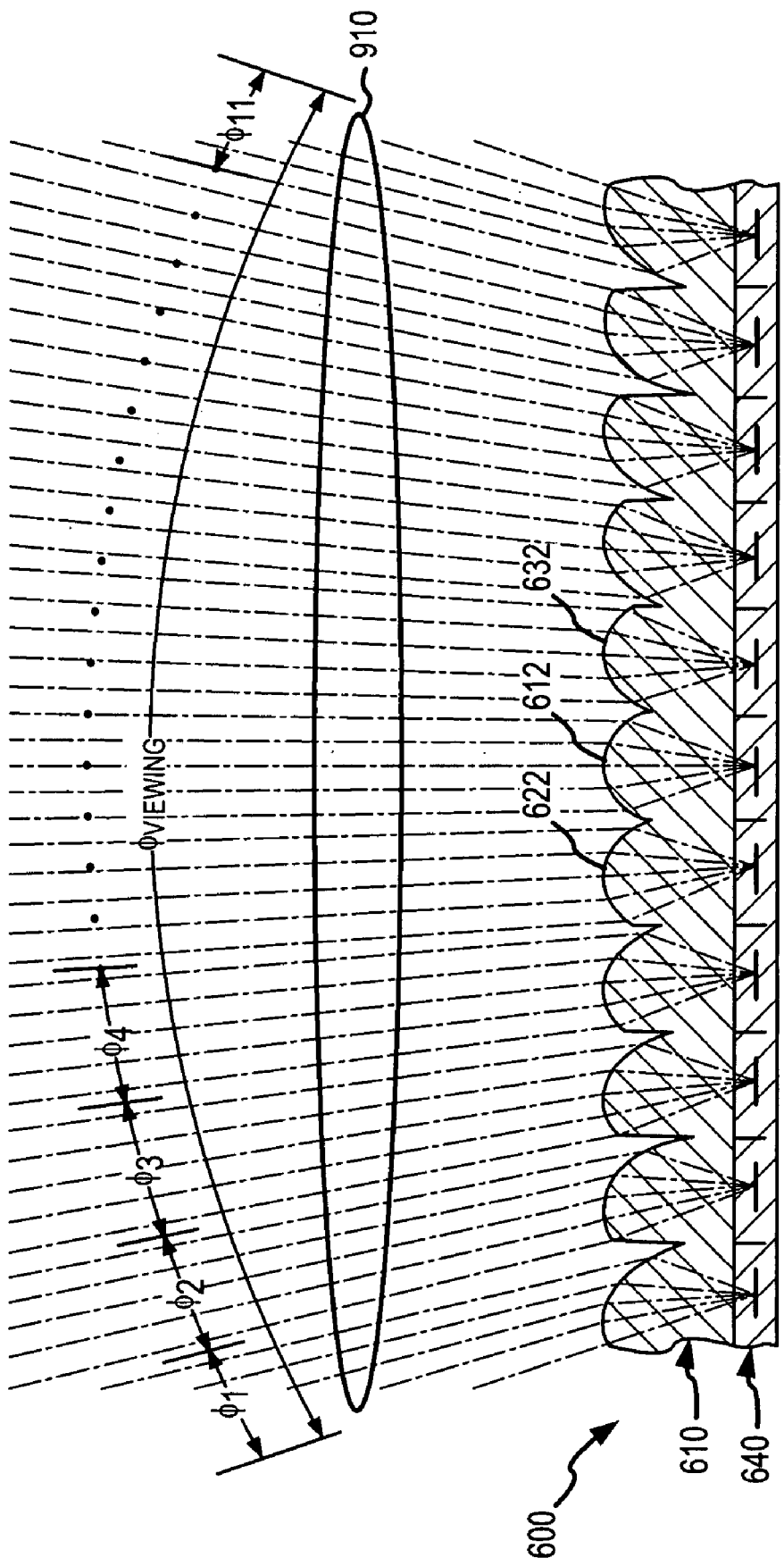
FIG. 9 illustrates a ray tracing for the image display assembly of FIG. 6 showing the effectiveness of having each lens or micro lens of a lens set or microstructure focus on a subset of a set of interlaced slices or elements rather than on all of the slices in the set (such as on one slice as shown (or 2, 3, or more slices but not all) rather than on all slices of the set (i.e., 11 slices in this example))

A check on or verification of the effectiveness of the design of a lens array such as array 610 of display assembly 600 may be obtained by a non-sequential ray trace as shown in FIG. 9. The rays 910 are shown to be focused on or reflected from the image elements or slices of the interlaced image 640 through the lens array 610. Each lens such as center lens 612 and adjacent side lenses 622, 632 each provide an angular distribution or lens-specific viewing angle, $\emptyset_1$ to $\emptyset_{11}$, with a unique direction (e.g., provide a stepped angular distribution relative to the next or adjacent lens). The overall viewing angle, $\emptyset_{Viewing}$, for the lens array 610 is provided by a combination of these lens-specific viewing angles, $\emptyset_1$ to $\emptyset_{11}$. For example, with 11 lenses as shown, each lens-specific viewing angle would be about $\frac{1}{11}$ of the overall viewing angle (e.g., 2 degrees when the overall viewing angle is 22, 3 degrees when the overall viewing angle is 33 degrees, and so on). A limited range of rays was traced in FIG. 9 to show more clearly the properties of the lenses of the lens set 610 in providing focusing on just a subset of the interlaces of a segment rather than all of the interlaces or image elements (with the subset being just one image element under each or pair/mapped to each lens of the lens set 610 in the embodiment of FIG. 9).

Figure 10:
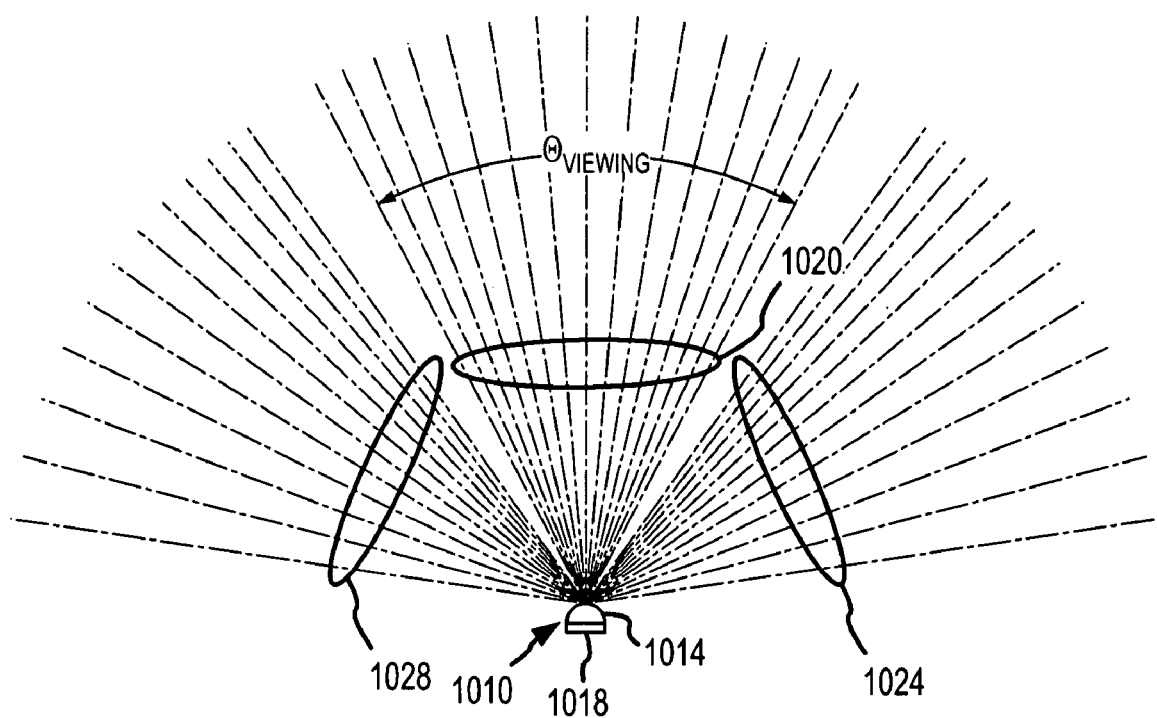
FIG. 10 illustrates in a more complete ray tracing for a single lens or micro lens of the present invention that would be included in a lens set or lens microstructure that would in turn be repeated a number of times to form a lens array of the present invention.

FIG. 10 illustrates further ray tracing for a particular lens 1014 such as a center lens of a lens array 1010 (with the other lenses not shown). The lens 1014 provides viewing angle, $\Theta_{Viewing}$, that would be combined with the viewing angles of the other lenses of the lens array 1010 to provide an overall viewing angle. The main distribution 1020 is made up of rays emitting from the pairs of interlaces and lens elements of a lens set. Distributions 1024 and 1028 are the result of rays that pass through neighboring lens elements of the lens set. The main distribution of rays 1020 is shown to be focused on the single slice or image element 1018 from a relatively large distance away from the lens 1014, with wider angles or rays falling outside or toward the edge of the viewing angle having reduced brightness and being out of the main viewing angle (e.g., the lens-specific viewing angle). The rays at the wide angles at 1024, 1028 are also focused on the slice 1018 but are typically outside the viewing zone for the lens 1014.

The lens set 610 of the display assembly 600 of FIG. 6 illustrates the use of eleven lenses for focusing on eleven slices or images from an interlaced image. This is intended to be a useful example of how to implement the invention but not as a limiting example because the number of slices in the sets or segments of an interlaced image may vary, and it may be useful to maintain a one-to-one relationship between the lenses of a lens set and the slices of an interlaced image. Alternatively, the ratio or relationship of lenses to the number of slices or image elements in an image or segment set may be varied. For example, in the example of 11 slices, 3 to 11 or more lenses may be used to provide lenses that focus on a subset of the slices but not on all the slices of an image or segment set of an interlaced image. More specifically, if five lenses were used to view eleven slices in each lens set of a lens array, the center lens could be configured to view three slices over its angular distribution or lens-specific viewing angle while two lenses could be provided in each side set of lenses. These side lenses would be mirror images of each other, and it may be useful for each of these side lenses to focus light from two slices at a desired direction (e.g., with each focusing direction being unique or different from other lenses of the lens set) such that each of the slices of the image or segment set was displayed by the five-lens lens set. This is possible by tuning or configuring each lens of the lens set to provide its own angular distribution or lens specific viewing angle that combine or are additive to create the overall viewing angle of the lens set or lens microstructure.

Figure 11:
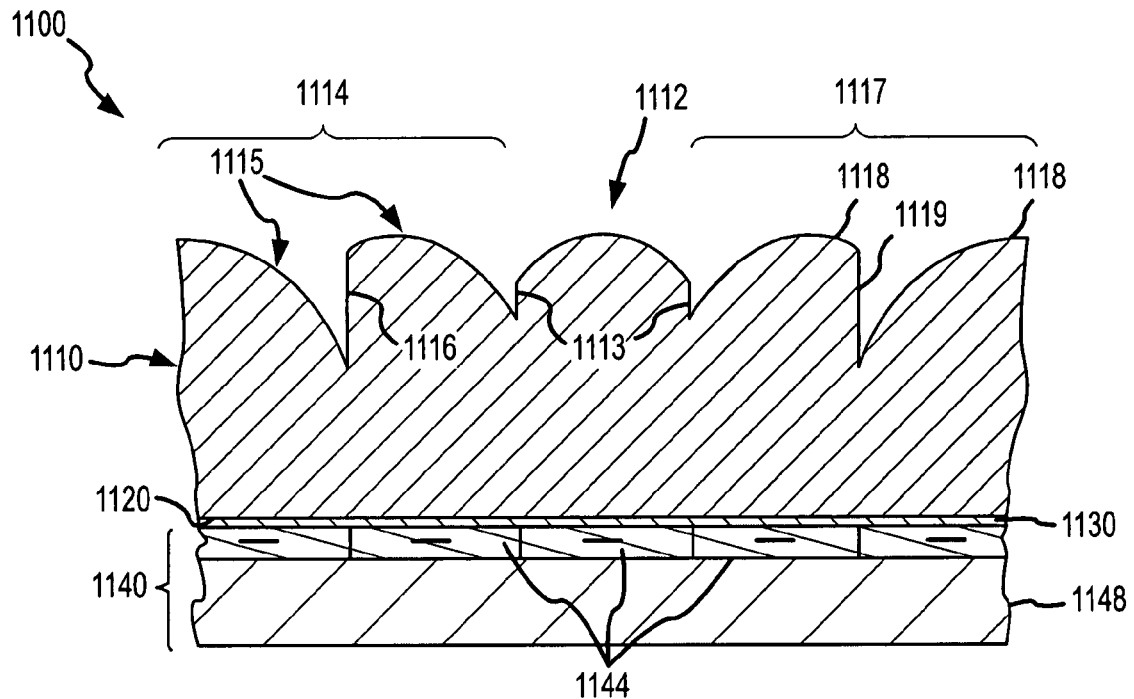
FIG. 11 illustrates with a cross section another image display assembly employing a differing embodiment of a lens set or lens microstructure of the present invention showing that the number of lenses or microstructures/micro lenses may be varied to practice the invention (e.g., 11 is not a requirement and other numbers such as 5 lenses may be used and typically the number of lenses in the lens set is selected as an odd number)

While the number and combination of lens numbers and image slices are too numerous to detail here and would be apparent to those skilled in the art with the above description, it may be useful to provide at least one additional example of a lens set configuration. FIG. 11 illustrates another interlaced image display assembly 1100 with the view shown being of one paired lens set 1110 and set of slices of a segment or image from the interlaced image 1140. As discussed above, a lens array for the assembly 1100 would typically include at least two of such lens sets 1110 that would be repeated across the lens array or lens sheet/substrate/layer of the assembly (e.g., lens sets may be provided at density or frequency of up to 40 or more LPI (lens sets per inch) with 10 to 30 LPI being useful in many embodiments). The assembly 1100 includes a lens set 1110 with five lenses shown as a center lens 1112, a pair of side lenses 1115 in a left lens set 1114, and a pair of side lenses 1118 in a right lens set 1117. In this embodiment, the center lens 1112 includes a pair of side walls 1113 that connect it to adjacent lenses 1115, 1118 while maintaining a desired thickness for the lens set 1110 (i.e., the lens set 1110 is a "constant" thickness lens set in which the thickness of the lens set as measured at the "peak" or thickest portion of each lens is substantially the same throughout the lens set). Likewise, the adjacent lenses 1115 and 1118 to the center lens 1112 have side walls 1116 and 1119 to join or connect them to the next lens of the side lens sets 1115, 1117 while maintaining the desired thickness for the lens set 1110 and a lens array containing the lens set 1110.

The lenses 1112, 1115, and 1118 may be configured or generated to have a particular cross sectional shape as shown with the configuration or design process discussed above and detailed in the algorithm shown in the program listing. The lenses 1112, 1115, 1118 are paired or mapped to image elements or slices 1144 in the interlaced image 1140. In this example, a single lens is paired with each slice 1144 (but a lens may be used to focus light from more than one slice 1144). In one embodiment of the lens set 1110, the lenses 1112, 1115, 1118 are each designed to deviate rays 8 degrees apart relative to the neighboring or adjacent lens in the lens set 1110. In other words, each lens of the lens set 1110 is adapted to provide an angular distribution or lens-specific viewing angle of about 8 degrees and the direction to focus line (or main direction) for each lens is selected such that the angular distributions are additive over the lens set 1110 (e.g., generally do not overlap or only overlap a relatively small amount).

Hence, the lens set 1110 of this example would have an overall viewing angle of about 40 degrees (or 5 times 8 degrees). It should be again noted that the angular difference or lens-specific viewing angle does not have to be consistent across the lens set 1110, and in some cases, each lens of the set 1110 may have a different angular distribution. Mote typically, when the angular difference or distribution is varied, a regular pattern is used such as by setting the center lens 1112 at one lens-specific viewing angle, the pair of lenses on either side of the center lens 1112 at a different lens-specific viewing angle, the pair of lenses adjacent to these two lenses moving outward in the lens set 1110 at yet another lens-specific viewing angle, and so on. In other cases, the center lens 1112 has one angular distribution and each of the side lenses 1115, 1118 has the same angular distribution (but, of course, with a differing main direction or focus line).

The display assembly 1100 of FIG. 11 is also useful for showing that the lens set 1110 may be paired to the interlaced image 1140 by adhesive or a bonding layer 1130. As shown, the lens set (or lens array of which it is one component) 1110 includes a planar side 1120 opposite the lens side, and this side abuts an adhesive layer 1130 (such as a thermally activated adhesive such as a polyethylene common in thermal laminating processes). The adhesive layer 1130 bonds the lens set 1110 to the interlaced image 1140 which is made up of the image slices 1144 (e.g., an ink layer) and a substrate or backer layer 1148, which may be plastic, paper, or other material upon which the ink of image slices 1144 is printed or provided. In manufacture, the adhesive 1130 may be provided on either the lens set/lens array 1110 or the interlaced image layer 1140. In one example, though, the adhesive is provided on the interlaced image layer 1140 (and, in some cases, a protective layer or coating formed of plastic or other transparent to translucent material may be provided over the ink of slices 1144 such as when the adhesive 1130 is a thermally activated adhesive). In other embodiments, the interlaced image slices 1144 are printed directly onto the surface or side 1120 of the lens set/array 1110 and a plastic or other material backing 1148 is applied with an adhesive that is provided with the backing 1148 (e.g., the position of the ink of slices 1144 and the adhesive 1130 is reversed in the assembly 1100), which is common with gift, smart, credit/debit, and other cards and other fabrication of conventional lenticular material products.

Figure 12:
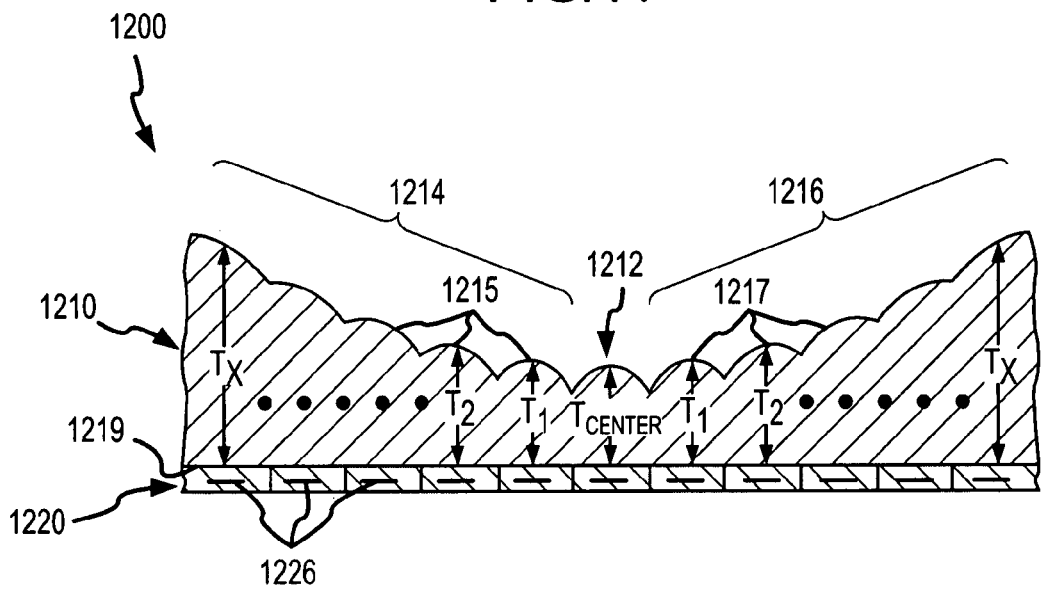
FIG. 12 illustrates yet another embodiment of an image display assembly similar to that shown in FIG. 6 with eleven lens elements in its lens set or lens microstructure but differing in that the lenses or lens elements do not include vertical or near vertical side walls to maintain a constant thickness but instead the thickness increases with each lens from the center lens or lens element.

The lens set embodiments previously discussed with reference to FIGS. 6-11 each have a lens thickness that is maintained constant or relatively constant across the lens set or lens microstructures (and hence, across a lens array or sheet of lens material of the present invention as the lens sets are repeated), and this typically resulted in the use of side walls being used to join the lenses (e.g., a vertical drop to the next or adjacent lens rather than allowing the lens thickness to exceed a preset desired lens or lens array thickness). FIG. 12 illustrates another embodiment of an interlaced image display device 1200 that uses lens sets 1210 in which no side walls are used to join lenses and the lens thickness increases with each lens from the center lens 1212. As shown, the assembly 1200 includes a lens set 1210 (or plurality of such lens sets 1210 providing a lens array) with a lens side and a back or opposite side/surface 1219. In this embodiment, an interlaced image 1220 is printed directly on the surface 1219 with a set of slices 1226 of an image segment but in other embodiments a primer, an adhesive, and/or other transparent/translucent layers may be interposed between the surface 1219 and the image 1220.

The lens set 1210 includes eleven lenses but the number may be modified to practice the invention, and the lens set 1210 is made up of a center lens 1212, a left set 1214 of side lenses 1215, and a right set 1216 of side lenses 1217. In this embodiment, the left set 1214 and right set 1216 have cross sections that are selected to be mirror or reverse images when viewed from a plane passing through the center line of lens 1212. The thickness, $t_{Center}$, of the center lens 1212 is less than each of the side lenses 1215, 1217 which have thicknesses, $t_1, t_2, \ldots, t_x$, that increase in a stepwise fashion as the outer edges of the lens set 1210 are approached. In this manner, the lenses 1215, 1217 can be formed without requiring a sharp or abrupt edge but can instead be a continuous curved surface between the end points or edges of adjacent or neighboring lenses.

To generate the cross sectional profile of the lens set 1210, the design or generation algorithm discussed above can be used with some minor modifications (and see the program listing at the end of this description). An exemplary design or generation process may begin with setting a desired thickness, $t_{Center}$, for the center lens (or inner pair of lenses if an even number of lenses is used) 1212 for focusing light from the inner image element or slice 1226. The center lens 1212 is generated as discussed for center lens 612 of FIG. 6 with the exception that when the edge of the lens 1212 is reached the end point becomes the starting point of the next lens (i.e., the adjacent one of the side lenses 1215, 1217). Another difference is that the thickness, $t_{Center}$, of the center lens 1212 is not forced on the succeeding lenses of the side lens sets 1214, 1216. As shown in FIG. 12, this results in a gradual climb with each successive lens from the center lens 1212 being slightly thicker. A ray tracing performed for the structure 1210 was performed and showed that the lenses 1212, 1215, 1217 effectively focused light from the paired slices 1226.

As shown in FIG. 11, a wide variety of lens arrays with differing numbers of lenses or sublenticules, viewing angles, thicknesses, and other parameters may be formed according to the present invention, with or without use of the lens array generation algorithm described herein. With this in mind, the inventors generated a number of additional lens array models and performed ray tracings of these modeled lens arrays or lens microstructures of such arrays to verify their functionality in focusing each lens upon one or more image within a larger set of interlaced images. These arrays and their tracings are not shown in additional figures because the inventors believe with reference to FIGS. 6-11, the program listing, and the corresponding description that their configuration and the method of generating such arrays will be clear to one skilled in the art.

In another modeled and tested (i.e., via ray tracing) lens array of the invention, the lens array included lens sets or microstructures with 19 lenses including a center lens and right and left lens subsets of 9 lenses each. The overall viewing angle of each microstructure was about 38 degrees with each lens providing an angular separation or step of about 2 degrees. The overall pitch of the lens set was 0.5588 millimeters (mm) and the array was provided at a relatively constant maximum thickness of about 0.0508 mm. Sidewalls were included in the side set lenses with an angle of 88 degrees (or 2 degrees from vertical). The lenses were formed in the generation algorithm using 22 steps for each lenticule (with a step size or DelX, of 1.33684210526316E-03) with a slope limit of 76 degrees. Ray tracing with the assumption that the material used to form the lens array had an index of refraction of 1.4 was successful in showing focusing on an image placed under the center of each of the 19 lens in the lens array.

In a similar embodiment, a lens array was modeled in which each lens microstructure had the same number of lenses in its lens sets (i.e., 19 lenses in each lens set) and the same thickness and overall pitch. However, in this lens array, the overall viewing angle was about 76 degrees and each lens provided an angle step size of about 4 degrees rather than 2 degrees as used in the prior embodiment. Other parameters including the number of steps and step size used to form or generate the modeled lens of the lens, microstructure were retained as was the index of refraction of 1.4. The lens set or lens microstructure was again subjected to ray tracing, and the results again showed very accurate focusing upon a single interlaced image positioned under or on the back or opposite side of the lens array (e.g., as would be the case if the interlaced image were printed or otherwise positioned to abut the planar back side of the lens array). This embodiment is useful for showing the ability to select a particular number of lenses for each lens set and then to design these lenses to each have a structure to provide a desired overall viewing angle for the lens set by providing a particular angular distribution or step for each lens in the microstructure.

In another embodiment of the invention, a lens array was modeled (i.e., generated using the generation algorithm described herein) that used lens sets with 7 lenses including a center lens and side subsets each having 3 lenses. In this embodiment, the following parameters were used: lens set pitch of 0.2 mm; a lens array thickness of 0.0762 mm; angular step size (or angular separation) of about 5 degrees to provide an overall viewing angle of about 35 degrees; an index of refraction for the lens array material of 1.4; vertical sidewalls (i.e., at 90 degrees from the planar back side of the lens array); and 22 steps used to generate each lens with a step size of 1.29870129870913E-03 mm and slope limit of 74 degrees. The modeled or generated lens microstructure was subjected to ray tracing to test its ability to focus light upon a single slice or image element from a set of interlaced images, and the ray tracing plot proved the efficacy of lens arrays using this embodiment of lens sets or microstructures to display interlaced images.

An additional lens array embodiment was modeled that altered this 7 lens per lens set embodiment by modifying two parameters. Specifically, the index of refraction for the lens array material was changed to 1.64 to show that the lens arrays of the invention can be formed from a variety of materials and still provide desired focusing results. Also, the angle step size or angular distribution was increased to 6 degrees such that each lens set provided a viewing angle of about 42 degrees rather than 35 degrees. The lens microstructure generation algorithm was utilized to generate a lens set or microstructure with these parameters or characteristics, and ray tracing of this modeled lens set verified that the lens set is capable of focusing light upon one or more interlaced images positioned adjacent each lens over the desired viewing angle of 42 degrees with each lens providing an angular step or separation of about 6 degrees. From these and the previous specific examples, it will be appreciated that the general concepts of the lens sets or microstructures used to form lens arrays for displaying interlaced images can be used to generate a huge variety of lens arrays simply be altering one or more of the design parameters. This allows a designer to select the parameters that are important to them such as viewing angle, number of interlaced image elements that need to be displayed under each lens microstructure, or the like and then to generate lenses for each microstructure with a geometry that provides these desired results or satisfies the input parameters.

The use of lens microstructures or lens sets in lens arrays to bend and focus light in order to view interlaced images provides an effective alternative to conventional lenticular technology. Lens arrays with properly formed/generated micro lens structures can replace lenticular lens arrays and allow viewing of interlaced images. Significantly, the use of lens arrays of the invention can decrease lens mass and/or thickness such as up to 90 percent or more reductions. The lens design criteria of conventional lenticular materials (i.e., including the requirement that the lenticule provides a thickness that allows focusing on a large set of interlaced slices) do not apply to these structures as the lens sets are used to replace the much larger and thicker conventional lenticules, but the lens microstructures or lens sets remain optically sound for imaging and generally are not diffractive. The micro lens set designs follow optical characterizations such as Lambert's law and Snell's law, but the lenses of each lens set act together as a group to display interlaced images paired or mapped to the lenses, thereby replicating the function of traditional lenticular lens arrays. However, they are not traditional lenticular lens arrays in part because the lens sets are not uniform lens arrays with all lenticules having identical cross sections but instead, each lens in a lens set or lens microstructure is configured to provide a unique focus line (or main direction) over a lens-specific viewing angle.

The lens arrays and their plurality of repeating lens microstructures can be formed from plastic, glass, ceramics, or other transparent to translucent materials from or using coatings, films, and/or other substrates. The lens microstructures can be custom designed for the combination of interlaced images and, as discussed, may have a pre-engineered overall viewing angle and lens-specific viewing angles or angular distributions and are also pre-engineered as to the number of interlaced images under the lens set or lens microstructure. Unlike conventional lenticular lenses, a lens array of the present invention can be used to replicate the functionality of a very coarse lenticular lens array without adding much (or any) mass to the array (e.g., without requiring a thicker lens array as the lens array becomes coarser or a lower LPI). For instance, a 15 LPI conventional lenticular lens array with a 22-degree viewing angle would likely require about a ⅜" thick lens array if made of acrylic. In contrast, a lens array with the lens microstructures of the invention can be made at about 3 mils thickness but yet perform similarly to the conventional lenticular lens array or better but yet use less than about 5 percent of the mass or lens array thickness.

It may be useful to elaborate at this time on exemplary methods of manufacturing and/or tooling the lens arrays of the present invention and more particularly, the lens sets or lens microstructure of the present invention as well as image display devices and products that incorporate such lens arrays. In some embodiments, the lens microstructures of a lens array can be engraved in a cylinder or plate, with care taken to be extremely accurate to create the proper optics. A preferred method of engraving is using an air bearing lathe and custom diamond tooling. Air bearing lathes operate by spinning the cylinder or cylinder with shim or plate on a cushion of air rather than bearings or other mechanical devices that can have worn gear slop or play. For the formation of the tool to create accurate lens microstructures of a lens array, it is preferable to provide accuracy at the micron level or even at the angstrom level.

In order to create an accurate embossing tool, custom diamond tools pre-engineered to a desired radius are made. As the lens elements are not usually defined by a particular radius, the cutting tools contour the embossing tool tangent to different parts of the radius tool as needed by the design determined by the usual cutting path of numerical control or N/C programmed machines. These tools mirror the desired design such as an array with lens sets shown in FIGS. 6, 11, or 12. It is typically useful to tool right and left hand diamond cutters to make the structure. The center lens is typically symmetrical, and the outside structures or lenses to the right and left (i.e., in the left and right side lenses) have different angles or angular distributions per the desired design of the optics of the overall structure. As discussed, the desired viewing angle of the total lens microstructure is a combination of all of the sub-structures in each lens set. Each of the micro lens structures has a different angle with a different or unique focus direction and is tooled differently to complete the lens structure. Each sub-lens structure is designed to complete the focus of the master lens structure. Each of the master lens structures or lens sets simulates the function of a conventional lenticule or lenticular lens. The design of the lens structures are the result of testing various possible designs and structures and determining what happens to the light rays going into and back out of the structures to the viewer.

Each of the microstructures may be as small as 10 microns or less and usually would be about 25 to 50 microns or more across. In some embodiments, each of the lens microstructures has a symmetrical center micro lens and a set of right hand and left hand lenses that mirror each other in design. Further in a typical embodiment, each of the sub structures or lenses on each side has an angle step that is pre-determined and the combination of the lens angular distribution or lens-specific viewing angles total the desired overall viewing angle of the lens microstructure or lens set. Prior to tooling or manufacture, the lens microstructures are adjusted/tuned and tested in a computer program, such as the program listing provided herein and/or with ray tracing programs, to verify where light rays focus to the image and back to a viewer. Each lens or microstructure within a lens set may be generated by providing or plotting 2 to over 100 data points, and these plotted data points can be adjusted for the numerous (e.g., millions) of possible combinations so as to enhance the use and function of the micro lens structure.

While one current known method of creating the embossing or extrusion tool, which in turn is used to form the lens arrays, is by using diamond tooling, other embodiments use laser etching or photo etching into nickel, carbon, copper or other metals to form the embossing or extrusion tool or to form molds. These alternative methods can result in accurate tooling but may require more extensive testing and development to provide the accurate three-dimensional shapes necessary to create the desired lens microstructures needed for lens arrays of the invention.

With the embossing tool, extrusion tool, mold formed, the fabrication of lens arrays with the lens sets or lens microstructures of the invention can be performed or completed. The lens microstructures and arrays with pluralities of such microstructures may be may be created by a number of manufacturing methods and into or using a variety of materials. The materials used for forming the lens arrays may be glass, nearly any type of clear (i.e., transparent to translucent) plastic including but not limited to PET, propylene, OPP, PVC, APET, acrylic, or any clear plastic, and/or a ceramic. In many embodiments, the preferred base material is a plastic, and the plastic may be extruded, calendared, cast, or molded with the tools formed as described above to provide a mirror image of the lens sets or lens microstructures arranged in a lens array (e.g., a plurality of side-by-side, linear lens sets selected in number to provide a desired frequency such as 10 to 50 LPI or another useful frequency to suit a particular interlaced image).

One preferred application or fabrication technique involves inline embossing at high speeds using a roll embossing tool. In this embodiment, a film is cast or extruded, and a pattern providing the lens array is placed into the film with a heat or chilled roller. A good film for this application is usually a stable film such as a PET, cast propylene film or, the like. These films can be embossed in thin films of less than one mil to 3 mils or more. A preferred thickness for lens arrays is in the two to five mil range. In this application, the film thickness with its lens microstructures can be pre-engineered to focus directly on the back of the film. The film itself can be printed in a web or roll form at very high rates of speed (e.g., over 2,000 feet per minute) in wide web applications. To form image display devices (such as labels; decals, cards, or the like), the film or sheet with lens arrays is mirror or reverse printed with the corresponding interlaced images. At this point, individual devices or products may be cut from the combined rolls or sheets. The film also may be embossed in a thickness that is less than the desired thickness for focus and printing so that an adhesive can be added to the film (i.e., between the lens array and the image slices) so that in combination the adhesive and the film provide the thickness required to focus to the interlaced images properly. The index of refraction of both the film and the adhesive in combination is taken into account in the overall formula or algorithm discussed above for generating lens sets or lens microstructures. In some cases, a film may also be co-extruded with a coating such as a UV, solvent, or water-based coating that may be embossed or extruded on the film with the micro structures built into the coating.

With a pre-made film, one can also print in a sheet or web form. The film can be applied over the printed (interlaced) image after the fact. This can be done using equipment such as thermal film, applicators like D and K, Bellhoffer and the like in which the film is heated and the adhesive is a hot melt chemistry made with EVA/polyethylene and is activated and applied in register to the printed and interlaced images. This can be done inline in a web process or in a sheet environment.

While extrusion techniques typically do not provide extreme film thinness and are primarily used to make plastics no thinner than 6 mils and usually between 6 and 30 mils, extrusion processes combined with the lens microstructures of the present invention can provide a much thinner lens array as opposed to traditional lenticular lens structures, which leads to a significant material cost savings as well as providing lens sheets or arrays that are very flexible and easy to apply to other structures/products. For example, a lens sheet or array can be extruded at a very coarse LPI for billboards and other applications in a relatively thin structure. In one implementation a 1 or 2 LPI lens for a billboard may require a lens structure of over 1" thick plastic if fabricated with conventional lenticular lens material, but this can be done with a microstructure lens array of only about 20 mils thickness. Hence, extruded plastic lens arrays of the present invention are economical with respect to material costs and are practical while a conventional lenticular lens array in a thickness of over 1 inch is not cost effective and is impractical.

Another method of manufacturing image display assemblies with lens arrays of the invention is to print the interlaced images on paper or plastic and then either inline or offline, printing or applying a coating, which may be an e-beam, UV, or water-based coating. The coating is applied in a predetermined thickness, and the lens microstructures may be embossed into the coating to form the structures and a lens array over the interlaced image at high speed. Again, this may be done in line or offline in a sheet fed press such as a Heidelberg or Komori press or a web press such as a Goss, Heidelberg, Or other type of flexo or web offset press. Further, while most embodiments using an embossing tool would use a roll or cylinder for the embossing tool, in any of the above embodiments, it is also possible to use a platen press or flat plate to emboss films or coatings.

With these various methods of manufacturing lens arrays and products including the arrays generally understood, it may be useful to further explain some of the preferred methods of manufacturing lens arrays according to the invention beginning with film embossing. Film embossing is a preferred method of manufacture that is anticipated to be easily adapted for producing lens array or material with the lens sets of the present invention. In this embodiment of manufacture, there are several methods of performing the embossing. Embossing can occur at the time film is cast, calendared, or extruded. Normally, the embossing is done in line with a chilled embossing roller while the film is still hot. The pressure is applied between a bottom and top roller. For example, the bottom roller may be a polished roller and the top roller an engraved roller, e.g., made out of a nickel-coated copper that is accurately machined in an air bearing lathe. The hot film, which may be propylene, PET, cast PVC, calendar PVC, cast propylene, PETG, or any combination of film or co-extrusion. While the preferred substrate or film may be polyester or PET, any of the substrates can be used. PET films tend to be more stable and maintain the desired structure through the printing and embossing process better than many of the other films. It is also important to note that the refractive index of the material chosen preferably is matched to the desired structure to make microstructures that provide accurate focusing on interlaced images slices. Depending upon width, temperatures, pressures, and other factors, the film may be embossed at up to 10,000 feet per minute. One reason for using a chill roller in the film embossing process is that the molecules in the film form and freeze into place forming the microstructures more accurately when a hot film is embossed with a chill roller regardless of the process.

In some embodiments, cold film is used. Cold film can be heated and embossed with a hot roller forming the microstructures. This is normally done at slightly below the melting temperature or at the melting temperature of the film. The speed at which this embossing can be done is based upon the heat and pressure of the equipment available. For example but not as a limitation, if a substrate melts at about 300° F., embossing is preferably done at about that temperature and, in some cases, at about 6,000 feet per hour.

In other embodiments, cold embossing is used to form lens arrays of the present invention. Cold embossing can be done using extreme pressures between nip rollers while narrow web widths are easier and require less tonnage. It is possible, however, in some embodiments to emboss in wide web at up to and over 60-inch web widths. Such cold embossing of the lens arrays into plastic or other material substrates can be done at fairly high rates of speed such as up to about 10,000 feet per hour or more. This is done much the way holographic embossing patterns are embossed in film. The structures tend to be accurate, but the life of the tool is sometimes not very long due to the higher pressures utilized.

Film embossing to form lens arrays of the invention may also include platen embossing. Flat dies are engraved in copper, magnesium, nickel, and other metals. These dies are placed in equipment such as Bobst die cutters and Heidelberg's, Kluges, and other equipment manufacturers' die cutters, punches, presses, or the like used in platen embossing. The film may be fed through in rolls or in sheets and embossed with heat and pressure or just pressure to form the lens sets or lens microstructures on a side of the film or substrate. The microstructures can be embossed onto any of the films using pressure and/or heat and appropriate dwell time to form the microstructures. A significant tonnage or high pressure, such as that needed to emboss holograms, is generally used to emboss the film in the case of platen embossing. In this embodiment, one can have "spot" lens structures that can be registered to the printing in a way such that the lens does not always appear over the printing.

Another preferred method of forming lens arrays according to the present invention is by using an ultraviolet (UV) or e-beam coating to form the structures in a web over a film or substrate (i.e., the lens array would include both the substrate and the web/coating in its array thickness). In a first embodiment of such coating processes, a base film is used that may be any of the films mentioned above. The film may be coated with a UV coating at about 1 to 5 mils, and the coating can be cured through an engraved roller which may be glass or clear plastic. The roller is clear such that the UV or E-beam is directed to pass through the roller while it is in contact with the substrate and squeezing the coating into place on the base film, whereby the microstructures are formed exactly or within very tight tolerances while they are cured to form a lens array as shown in the included figures.

There are other preferred or alternative methods of using e-beam curing or UV curing to make lens arrays with lens microstructures rather than using a clear cylinder to shine UV light through while in contact with the embossing cylinder. For example, one coating method uses a modified laminator to emboss the pattern onto one surface of a film or substrate. This can be done or accomplished with very little pressure using an engraved cylinder and an application roller that applies UV or e-beam coating to the film (Which is likely to be propylene, PET, or the like). The coating on the film or substrate is then cured through the film while the film is in contact with the embossed roller. In this method, the speed can be in excess of 10,000 feet per hour and can be done without excessive wear on the embossing cylinder. A downside or possible issue with this method is the cost, which tends to be higher because of the UV liquid used to cast the impression. However, because most of the lens microstructures are less than a few microns deep, a thin coating is sufficient for producing the lens microstructures (e.g., a coating of less than about 1 mil and more typically less than about 0.3 mils such as about 0.25 mils may be used successfully to create a plurality of lens sets or microstructures with a coating).

In an alternative coating process, a base film is coated with any of the clear coatings mentioned above (keeping in mind that any coating and its refractive index is combined with the thickness and appropriate film refractive index for the appropriate and pre-engineered thickness of the lens array). After the coating is applied to the substrate, it is cured and then embossed. In some cases, the coating is only partially cured and then embossed while it is in a semi-liquid state. In some other cases, the coating on the substrate or base film is embossed in a total liquid state or more liquid state and then cured after the embossing such as down the web a few feet up to several hundred feet. In the former case where the liquid is partially cured, the coating may have a final curing later down the production line either immediately or down the web several feet, and in some cases, the coating may be pre-engineered to post cure in a solid state several hours or even days later to an acceptable hardness.

As shown in FIGS. 1-12, the display assemblies of the present invention generally include a lens array combined with an interlaced image. The lens array and the interlaced image may be combined into an assembly or product in numerous ways to practice the invention. For example, printing of the interlaced image can occur first in gravure, flexography, offset (lithography), screen-printing, or digitally prior to the application of the micro lens structures (e.g., before a lens array and interlaced image are combined). This printing could appear in roll, sheet fed, or other method in any of the printing methods. After the interlaced graphic is printed, the lens array or film having numerous lens sets or lens microstructures on one side is applied to the interlaced image (or a substrate upon which the image is printed) by film lamination of a pre-embossed lens structure. This application of film to the pre-printed roll or sheet fed structure can be done inline on a web press (gravure, flexo, web offset, or any other press feeding roll stock) either inline with the printing or offline in a post lamination process.

In some embodiments, the film is applied with a water based adhesive, hot melt, or thermal adhesive such as is extruded in EVA or other methods directly onto the film with a hot melt polymer such as polyethylene, common to the thermal lamination area. Any adhesive used preferably is as clear as possible, and its refractive index is taken into account in the total calculation of each of the polymers and the thicknesses and combined appropriately to equal the correct combined refractive index necessary to focus the lens microstructures on the pre-interlaced images. The necessary "critical" alignment is as set forth in the attached figures, so that the interlaced printed image and the lens structures coincide properly and align along their elongate axes as shown. This process can be done inline with the printing in a web or roll format or offline later after the roll is printed. Again, the adhesive is preferably clear and the thickness of the adhesive and its refractive index is known so that the total of the polymers (or substrate layers of a finished product) has a desired refractive index to focus to the interlaced images underneath the combined layers or substrates (e.g., underneath the lens microstructures in the lens array, an adhesive layer, any primer layers, and any other material thicknesses between the lens' surfaces and the interlaced image slices).

The combination of the lens array with the interlaced image may also be done in sheet form, such as with the printed sheet or cardboard in an interlaced form and then post laminated with a pre-embossed (and many times pre-adhesive) coated substrate or film roll containing the lens microstructures for displaying the interlaced images. Again, the alignment in the proper direction is important. The display assembly fabrication can be done with a Bellhofer, D and K Laminator, GBC laminator or other types of laminators that apply film through hot melt (EVA type, extruded, and activated between 180° F. and 350° F.) or solvent-based pressure sensitive, urethane, or water based adhesive. Again, line up or Y-axis registering is important to achieve desired results. Normally, in a sheet fed environment for packaging, the sheets of paper or plastic would be printed with an interlaced image. Then, the roll of pre-embossed film (or roll of lens array material) would be attached through whatever adhesive process is being used such as heat, pressure, or a combination of both.

Much as described above, UV, E-beam, water-based embossed, and other post-print coatings may be applied directly to the printed substrates. For example, these coatings that provide the lens array may be applied via application roller in the appropriate and pre-engineered thickness for the correct combination of refractive indexes to form the lens microstructures on top of or adjacent to the printed interlaced image on the substrate (e.g., plastic, paper, or other material substrates or layers). The coatings may be embossed over the interlaced printing by way of an engraved cylinder, flat die, or other method using pressure or heat and pressure thereby forming the coating into a lens array of many lens sets or lens microstructures. The coating may also be partially cured before embossing, uncured in liquid state, or partially cured and post-cured later by means of E-beam, UV, or any other method including solvent or water evacuation. This embossing may be in the form of a roll or sheet and will be accurately post embossed.

In some embodiments, it is desirable to use printing offset, digital printing, screen printing, or other printing onto a sheet fed film or web and then to apply a lens array. For example, a film may be embossed to contain the lens array (e.g., a plurality of lens sets or lens microstructures) and then be laminated to the pre-printed substrate inline or in an offline process. The interlaced image is printed so that the files match the lens array configuration and its lens sets exactly or within tight tolerances, with such alignment generally being required to be excellent as with any lens system to achieve desirable results. The film upon which the lens array is embossed can have an EVA adhesive upon the non-lens or planar side and be applied with a Bellhofer, D and K or other thermal laminator at about 150 feet per minute over the substrate. This is particularly advantageous for printing cartons and thicker boxes. The substrate, e.g., cardboard or board of some type such as SBS and boards of 10 mils to over 40 mils, can be printed with the interlaced image on a traditional sheet fed system such as a Heidelberg, Komori, Roland, KBA, and the like. The interlaced image can be relatively coarse (such as 20 to 60 LPI), and the microstructures applied can be embossed on the film, which will total up to about 2 to about 10 mils or more in thickness. The lens array (e.g., the embossed film combined with any adhesive/primer) function similarly to and provides the quality that a conventional lenticular lens array over 80 mils thick would provide. Obviously, not only is it impractical to use a lens over 80 mils, it is also cost prohibitive for most applications. In contrast, the embossed film of the present invention costs very little to produce and packaging an item or product with that lens array (e.g., wrap or the like) will have a dramatic effect (e.g., in some embodiments over 40 views of animation are provided with only a few mils of lens array material).

Any and all of the methods described herein can be reproduced using a combination substrate with the same results and methods of manufacture. In these embodiments, the substrate or film itself can be made in several different ways. The base films may be a combination of APET, PETG, and/or combinations of film such as PET and other softer films. In many cases, the top line or layer of film is a softer film like polyethylene combined with a tougher substrate such as a polypropylene. In these combination substrates used for forming lens arrays, the base film can provide stability while the top film can be softer and easier to emboss with the lens sets or lens microstructures of the present invention to form a lens array including the top film and tougher substrate. An ideal combination may be a PET blase film with a softer propylene film laminated with a solvent based adhesive or solvent less adhesive such as a urethane adhesive like "More Free 403" by Rohm and Haas. The top film can be laminated with a thermal film EVA adhesive as well.

As described with reference to FIG. 1 and elsewhere, a display assembly can readily be formed simply by printing directly on the reverse side of a pre-embossed film or substrate (i.e., onto the back or planar surface of a lens array). One efficient method of production of display assemblies involves printing onto a pre-embossed film a pre-engineered number of interlaced image slices or sets of slices, e.g., sets of slices equal in number to the number of lens microstructures in the lens array opposite the interlaced image. The printing can occur in sheet or roll form at a very high rate of speed (e.g., over 2,000 feet per minute). The film may be printed in a course and easy to print interlaced image configured for a conventional lenticular material of 20 LPI or less. Most of the lens sets created at this frequency are as powerful for imaging as the normal thicker counterpart found in conventional lenticular material. In this case, the film lens will be as much as 98% thinner and more cost effective to show animation and 3D. One benefit is that the display assemblies or products formed to include a lens array of the present invention with a corresponding or matched interlaced image can be produced for about the same cost as a normal film laminated product that is not configured for displaying interlaced images. With implementation of the present invention, it is anticipated that it will become acceptable to print to the back of the lens with the correct file and application. This is significant when compared with the manufacture of conventional lenticular material device because not only can one print in web which would be impossible with the thicker conventional lenticular material (i.e., the equivalent lens may be more than 100 mils thick and could not even be printed offset) but the costs are also expected to be extremely low and represent less than 5% (i.e., a 95% cost savings) of traditional lenticular materials.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The above discussion provides examples of lens sets with linear or elongated lenses. However, in some embodiments, the teaching of the lens microstructure or lens sets each configured to provide focusing on one or more interlaces (i.e., a subset) of a segment set can be applied to produce non-linear lens sets. For example, the lens sets may be alternative shapes with round (concentric lenses extending out from a round center lens or "bugs eye" arrangements of round or other-shaped lenses), square, and diamond shaped structures being just a small portion of the possibilities to extend the teaching of lens sets described herein.

The above description mainly provides a description of lens arrays formed from numerous lens microstructures in which an odd number of lenses are provided with a center sublenticule or lens and two mirror image side sets of lenses. While this is a preferred configuration for many applications, the center lens or sublenticule need not have exactly zero degrees of deviation for the rays and lens sets may also have an even number of sublenticules or lenses. For example, the sublenticule immediately to the left of the center of the lens set is in some embodiments of the invention, designed to deviate the interlace rays −1 degree and the sub lenticule immediately to the right of the center of the lens set could be designed to deviate the rays +1 degree. The second lenticule left of the center of the lens set could have a deviation design of −3 degrees and so on. A comparison of angular steps or deviations of two lens sets of the invention, one with a center lenticule designed for zero degrees as in many examples of the present description, with a similar design with no center lens or sublenticule, is given as follows: −8, −6, −4, −2, 0, 2, 4, 6, 8 for one embodiment and −7, −5, −3, −1, 1, 3, 5, 7. Each of these lens set designs has 2 degrees of deviation from sublenticule to sublenticule and would likely function similarly (e.g., be hard to distinguish from one another in use in displaying an interlaced image). The concepts described above for odd numbered lens sets can easily be extended to such even numbered lens sets, and these "non-zero" designs are considered within the breadth of the current description. Further, the above examples of lens sets typically call for a lens set to provide a centered viewing angle from a center lens or center line of a lens set. However, alternative embodiments may use "biased" lens sets in which the angular distribution is not centered. For example, applications might need or be more effective with a bias to the angular design such as a lens set with an even number of lens with an off-center zero deviation of light rays (e.g., a 6-sublenticule lens set may be arranged with deviations of −8, −6 −4, −2, 0, 2 degrees with many other examples being apparent to those skilled in the art), which may be useful in a package or product that might viewed from the side.

In other embodiments of image display assemblies such assemblies 100, 150 that are used, for example in products such as packages, books, bottles, and the like 200-500, it may be useful to utilize other lens sets or microstructures in the lens arrays to achieve a desired imaging result. For example, the microstructures shown in FIGS. 6-12 provide a lens array configured to provide an overall viewing angle provided by a plurality of individual lenses or sublenticules that allow a viewer to sequentially step through a number of image elements in an interlaced image. For example, the overall viewing angle may be 33 degrees and eleven lenses may be used to step through this viewing angle 3 degrees at a time by providing eleven different but substantially adjacent viewing angles or distribution or direction angles with the lenses in the microstructure or lens set. As discussed above, this has allows very thin lens arrays to be produced that allow an interlaced image to be viewed with results as good as or better than that achieved with much thicker lenticule-based arrays (with each thin microstructure or lens set replacing a relatively thick lenticule). However, there are numerous applications in which it may be desirable to achieve enhanced viewing of an interlaced image or improved imagery with lens arrays. For example, it may be desirable to provide improved control over mixing that may result from viewing of adjacent image elements with adjacent lenses or sublenticules of a lens microstructure. Additionally, some applications can be significantly improved by increasing the brightness of the viewed image such as by reflecting more light from particular portions or elements/slices of an interlaced image.

With these concepts and goals in mind, the inventors determined that it may be useful in some embodiments of lens arrays to have the lens set or microstructure be formed from one or more dual lens structures. Each of these dual lens structures is formed of two lenses or sublenticules that are configured (such as by utilizing the techniques described above with reference to the lenses of FIGS. 7 and 8) to provide a different and substantially opposite distribution of rays from one or more paired image elements or slices in a particular direction. In other words, one of the lenses or sublenticules in a dual lens microstructure is formed to have a viewing or direction angle that is positive while the other of the lenses has a viewing or direction angle that is negative, with "positive" and "negative" typically being measured relative to a perpendicular plane passing between the adjacent, paired lenses of the dual lens structure. In some embodiments, each lens of the dual lens structure is paired with a single image element from the interlaced image or set of image elements, but, in other cases, each lens may be paired with a larger subset of the interlaced image. As will be discussed further below, brightness is enhanced in part in some embodiments by having a particular image slice repeated in the image set and having more than one lens of the lens array paired with the repeated image slice. Mixing may be controlled or limited by providing a particular pattern of the interlaced image other than a simple sequential interlacing as may be used with the arrays and microstructures of other embodiments of the invention.

Mixing may further be controlled by other techniques such as by leaving some lenses of the lens microstructure unpaired with an image element or slice.

Figure 13:
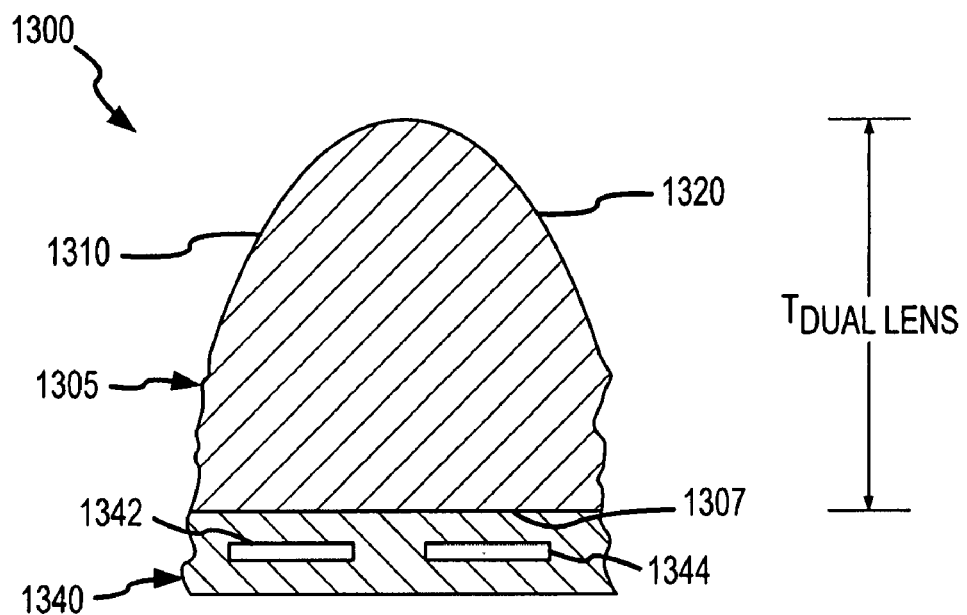
FIG. 13 illustrates a cross section of a dual lens structure that may be used in one embodiment of a lens microstructure or lens set of an image display assembly of the present invention showing the pairing of two lenses or sublenticules having differing direction angles (e.g., one having a positive direction angle and one having a negative direction angle which may be of the same or differing magnitude) to distribute rays in opposite directions.
Figure 14:
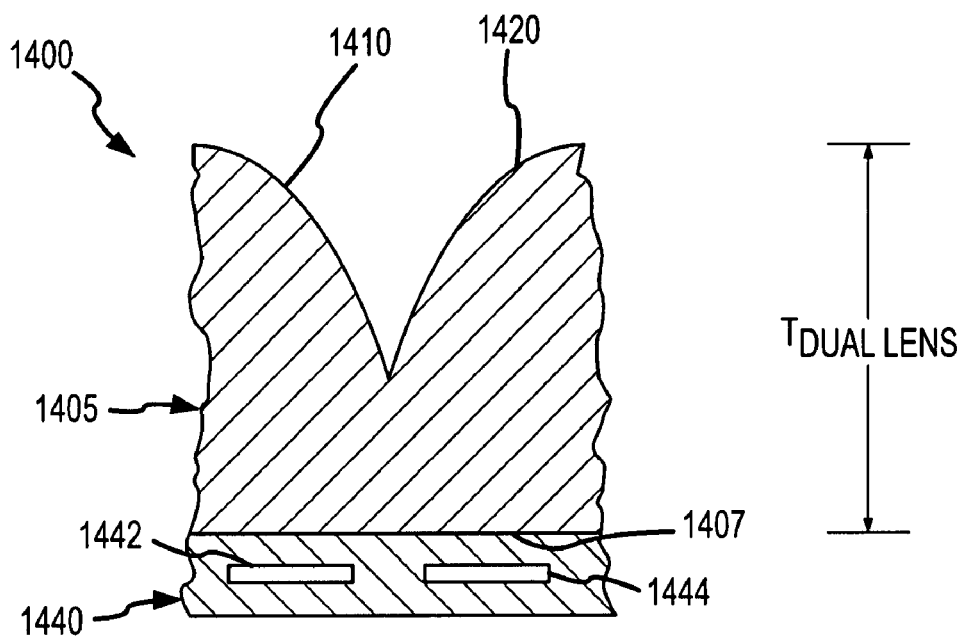
FIG. 14 illustrates a cross section similar to that shown in FIG. 13 of an alternative dual lens structure that also may be used in a lens set or lens microstructure of an image display assemblies of the invention for viewing interlaced images and that shows the use of two lenses or sublenticules having direction angles in which the negative direction angle is provided on the "left" side of the lens structure when viewed along the structure's longitudinal axis in contrast to the dual lens structure shown in FIG. 13 in which the lens or sublenticule with a positive direction angle is provided on the left side of the dual lens structure.

FIGS. 13 and 14 illustrate two embodiments of display assemblies 1300, 1400 using dual lens structures 1305 and 1405 in their lens sets or microstructures. Only one dual lens structure 1305, 1405 is shown in each assembly 1300, 1400, but it will be understood that microstructures or lens sets using such dual lens structures 1305, 1405 may use one such structure (e.g., one part of lenses or sublenticules) or more typically use two or more of such structures (e.g., 2, 3, 4, or more dual lens structures per lens set or lens microstructure in a lens array provided in an image display assembly). As will be seen with ray tracings, a main difference between the two assemblies 1300, 1400 is that the dual lens structure 1305 includes a left or first lens that has a positive viewing or direction angle while the dual lens structure 1405 includes a left or first lens that has a negative viewing or direction angle.

Referring first to FIG. 13, the lens structure 1300 is shown as it may be used within a image display assembly with a planar or textured back surface 1307 upon which an interlaced image layer 1340 (e.g., ink layer or multiple layers used to provide the image) is positioned and/or attached. In this example, the image set of the interlaced image layer 1340 includes a pair of or first and second image elements or slices 1342, 1344. To allow these images to be viewed, the dual lens structure 1300 includes a first lens or sublenticule 1310 that may be considered the "left lens" or "left lenticule" that is paired with the image element or slice 1342 to allow the element 1342 to be viewed through a positive viewing or direction angle (e.g., positive 5 to 45 degrees or the like with 15 to 30 degrees being a useful range in many applications). A second lens or sublenticule 1320 (i.e., a "right lens" or "right lenticule") is provided adjacent to the first lens 1310 and is configured to provide a negative viewing or direction angle for the paired image element or slice 1344 as light rays pass through the lens surface and thickness of the of the dual lens structure, $T_{Dual\ Lens}$, which may be similar to the thicknesses discussed for the lens arrays of FIGS. 1-12.

In some preferred embodiments, the direction angles of the two lenses 1310, 1320 have substantially equivalent absolute values such as the positive and negative 15 degrees, positive and negative 20 degrees, positive and negative 30 degrees, and the like. In other embodiments, the lenses 1310, 1320 may have direction angles that are opposite in direction relative a to a plane passing between the lenses 1310, 1320, e.g., are positive and negative, respectively, but that differ in absolute value such as one being positive 15 degrees while the other is negative 25 degrees. Further, in some display assemblies 1300, the lens microstructures or lens sets are formed by including 1 to 10 or more dual lens structures 1305 with each being substantially identical, but, in other assemblies 1300, the dual lens structures 1305 will vary in configuration as will be described with reference to FIGS. 15-18, to achieve a desired imaging effect for an interlaced image.

In the lens display assembly 1400 of FIG. 14, the lens microstructures are formed from one or more of the dual lens structures 1405 upon which in interlaced image layer 1440 is provided or bonded via surface 1407. The interlaced image layer 1440 is shown in this example to have two image elements or slices 1442, 1444 that are paired for viewing with the dual lens structure 1405. More accurately, the dual lens structure 1405 includes a first lens or sublenticule 1410 that is paired with the element 1442 and a second lens or sublenticule 1420 that is paired with the element 1444. Rays of light are focused through the thickness, $T_{Dual\ Lens}$, of the lens structure 1405 (and, Win some instances, of the lens array formed from the lens structure) onto or from the image elements 1442, 1444 by the first and second lenses 1410, 1420, respectively. In contrast to the lens structure, 1305 of FIG. 13, the first or left lens 1410 is configured to have a negative direction angle and the second or right lens 1420 is configured to have a positive direction angle. Either of the structures 1305, 1405 may be used to form a lens set or microstructure of lens arrays of the invention with a significant feature being that the first and second (or left and right) lenses or sublenticules of each dual lens structure have opposite direction angles (e.g., one is positive and one is negative relative to a plane passing through the dual lens structure).

Typically, each of the lenses of the dual lens structures 1305, 1405 will be of the same width and have the same thickness (e.g., be about the same size as measured by cross sectional area) to ease manufacturing and to achieve a useful imaging result, but this is not a limiting requirement as some dual lens structures may have lenses with differing widths and/or thicknesses to practice the invention. Similarly, the thickness of the dual lens structures, $T_{Dual\ Lens}$ may be held constant throughout a lens set or microstructure (such as through the use of sidewalls or edges as discussed above or other manufacturing techniques) or this may be varied somewhat to practice the invention such as by having a smaller thickness for interior or central dual lens structures and a larger thickness for exterior or edge dial lens structures (as is shown in the microstructures of FIGS. 15-18).

Figure 15:
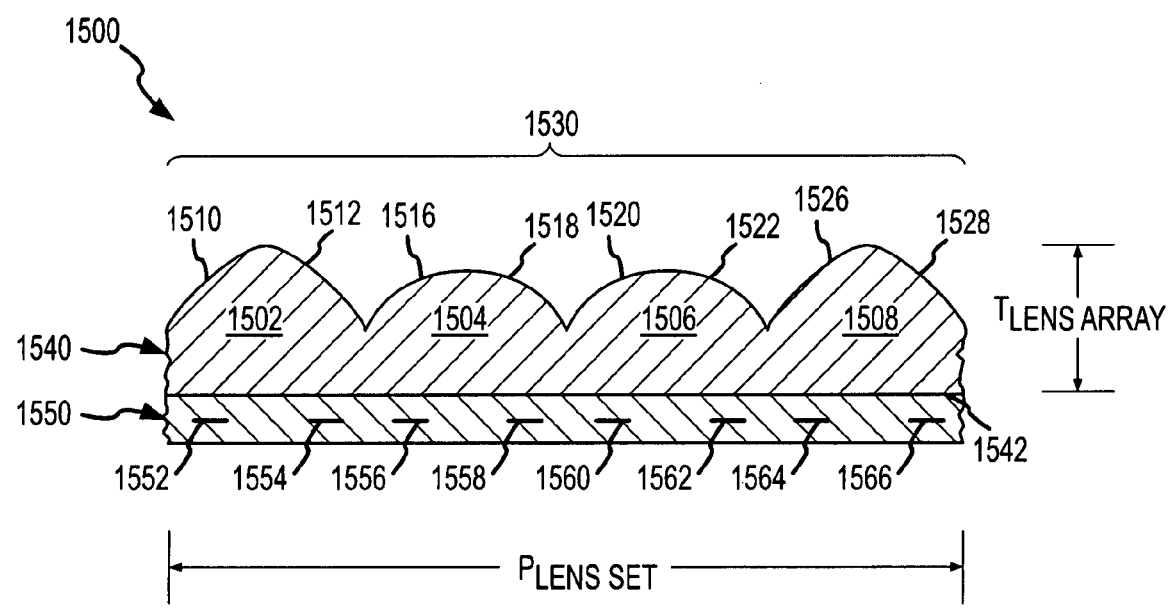
FIG. 15 is a partial, sectional view of an image display assembly including a lens set or lens microstructure formed with the use of a plurality of dual lens structures similar to that shown in FIG. 13 (i.e., formed with 4 of the dual lens structures and 8 lenses or sublenticules in this non-limiting example) for viewing an interlaced image with each lens or sublenticules being paired with a subset of the interlaced images (e.g., one of the image elements or slices)

FIG. 15 illustrates an image display assembly or apparatus 1500 that would be formed to include a number of lens sets or microstructures 1530 (with only one being shown for simplicity of illustration). The assembly 1500 may then be used in products such as in those shown in FIG. 2-5 or the like to allow viewing of an interlaced image. In the microstructures shown in FIGS. 6-12, one or a few of the interlaces or image elements are normally associated with a given lens or sublenticule of the lens set or microstructure, and the lenses are varied in curvature to send the ray distributions of the interlaced images in desired directions to generate an overall viewing angle formed in an additive or sequential manner from the combination of the individual viewing or direction angles of the lenses. In the lens set or microstructure 1530, in contrast, the lenses or sublenticules are provided in dual lens structures 1502, 1504, 1506, 1508 so as to alternately distribute the rays in opposite directions (as is shown in the ray tracing of FIG. 16). The microstructure 1530 is typically repeated to form a lens layer or array 1540 that is formed of a plurality of elongated, dual lens structures 1502, 1504, 1506, 1508 that extend along one side of the array 1540 with a planar or textured surface 1542 provided opposite the structures. An interlaced image or image layer 1550 is printed directly or bonded to the surface 1542 and includes a set of interlaced images such as eight image elements or slices 1552, 1554, 1556, 1558, 1560, 1562, 1564, 1566. The pitch, $P_{Lens\ Set}$, and lens array thickness, $T_{Lens\ Arrays}$, may be similar to those of the microstructures or lens sets described with reference to FIGS. 1-12.

The microstructure 1530, in the illustrated example, includes four dual lens structures 1502, 1504, 1506, 1508 to provide viewing of the 8 image elements 1552, 1554, 1556, 1558, 1560, 1562, 1564, 1566. In this, regard each dual lens structure includes a pair of first/left and second/right lenses or sublenticules (i.e., lenses 1510, 1512, 1516, 1518, 1520, 1522, 1526, 1528) that are paired with a single one of these image elements that is positioned under or adjacent the corresponding, paired lens as shown in FIG. 15. In each dual lens structure, the first or left lens 1510, 1516, 1520, and 1526, has a positive slope that produces a ray pattern associated with a positive direction or viewing angle. The second or right lens 1512, 1518, 1522, and 1528 has an opposite or negative slope that produces a ray pattern associated with a negative direction or viewing angle.

As discussed earlier, the magnitude of the absolute value of the direction angles are typically substantially equivalent for the lenses within a dual lens structure (e.g., the first lens 1510 may be configured to have a direction angle of +28 degrees while the second lens 1512 is configured with a direction angle of −28 degrees). The direction angles provided in each of the dual lens structures 1502, 1504, 1506, 1508 may be substantially equal such as when only two image elements are included in the image set under the microstructure 1530 and they are repeated four times (i.e., viewed through each of the dual liens structures). More typically, different absolute values for the direction angles will be used at least for some of the lens structures to allow 3, 4, or more image slices or elements to be viewed through the lenses of the dual structures (i.e., a different direction or viewing angle is used for each image slice or element that is to be viewed with each of these image slices or elements being unique in some embodiments or at least some being provided two or more times to increase brightness of the that image element or slice as discussed further below). As shown, the two outer or exterior dual lens structures 1502 and 1508 are shown to be thicker than the interior structures 1504, 1506 and have a maximum thickness equal to the thickness, $T_{Lens\ Array}$, of the array 1540. This is not a requirement, though, as each structure may be of equal thickness.

Also, as shown, the exterior structures 1502, 1508 are substantially equivalent in cross sectional shape as are the interior structures 1504, 1506. This provides the exterior structures 1502, 1508 with lenses having equivalent slopes and direction angles, and, similarly, the interior structures 1504, 1506 with lenses having equivalent slopes and direction angles. For example, the curvature of the lenses 1510, 1512, 1526, 1528 may be selected to achieve direction angles having absolute values that have equal absolute values (e.g., values selected to be less than about 60 degrees and more typically less than about 45 degrees) such as 15 to 30 degrees or the like with the left or first lenses 1510, 1526 being positive and the right or second lenses 1512, 1528 being negative. In this example, the curvature of the lenses 1516, 1518, 1520, 1522 may be selected to achieve direction angles having absolute values that have equal absolute values less than those of the exterior structures 1502, 1508 such as 15 to 30 degrees or the like with the left or first lenses 1516, 1520 being positive and the right or second lenses 1518, 1522 being negative.

Figure 16:
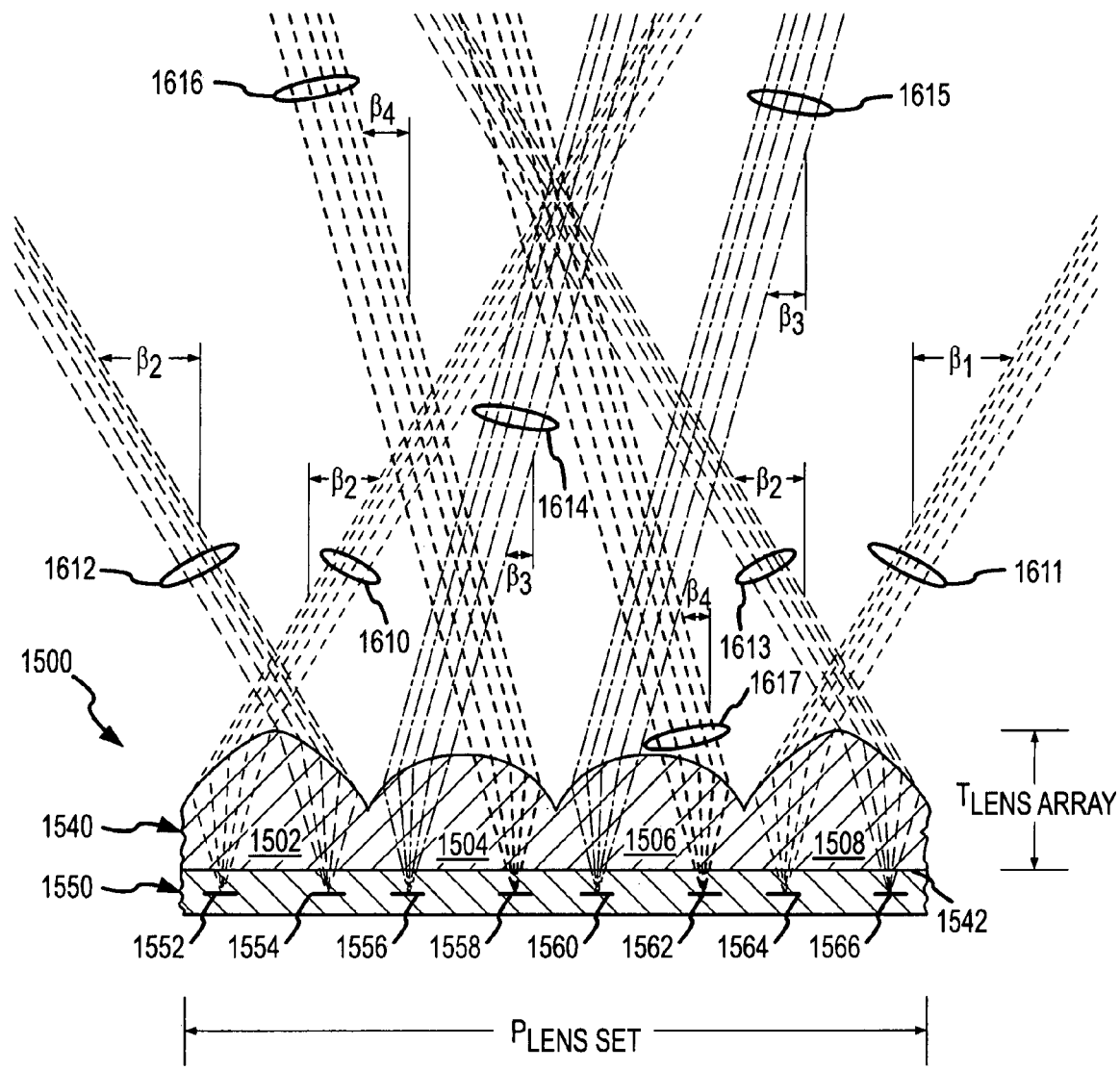
FIG. 16 illustrates a simplified ray tracing for the image display assembly of FIG. 15 showing the effectiveness of having each lens or sublenticule of a lens set or microstructure focus on a subset of a set of interlaced slices or elements rather than on all of the slices in the set and, more particularly, for using dual lens structures to direct or distribute from adjacent ones of the image elements or slices in opposite directions (such as a first viewing or direction angle selected from the range of positive 5 to 45 degrees or the like and a second viewing or direction angle selected from the range of negative 5 to 45 degrees or the like)

At this point in the description, it may be useful to discuss the ray tracing for the image display assembly 1500 and for microstructure 1530 shown in FIG. 16. In this particular example the lens set or microstructure 1530 is formed from 8 lenses or sublenticules 1510, 1512, 1516, 1518, 1520, 1522, 1526, 1528 provided in 4 dual lens structures 1502, 1504, 1506, 1508. In each dual lens structure, the first or left lens has a positive slope to provide a positive direction angle and the second or right lens has a negative slope to provide a negative direction angle. The exterior or outer structures 1502, 1508 are formed with similar cross sectional shapes so as to provide a ray tracing or pattern 1610, 1611 from their first or left lenses 1510, 1526 centered on a positive angle, $\beta_1$ which is shown to be about +30 degrees to the right of vertical (but, could be a different angle such as an angle less than about +60, or more degrees). The second or right lenses 1512, 1528 of these dual lens structures 1502, 1508 have negative slopes and provide a ray pattern 1612, 1613, that is similar in magnitude but in the negative direction such as one centered, on a negative direction angle, $\beta_2$, which is shown as about −30 degrees to the left of vertical. The two interior dual lens structures 1504, 1506 likewise are shown with similar cross sectional shapes (but differing from the exterior structures) to provide left or first lenses 1516, 1520 with positive slopes to generate ray patterns 1614, 1615 centered about a positive direction angle, $\beta_3$, which is shown as about +15 degrees to the right of vertical and to provide a right or second lenses 1518, 1522 with negative slopes that generate ray patterns 1616, 1617 centered about a negative direction angle, $\beta_4$, which is shown as about −15 degrees to the left of vertical.

As shown, each "side" of each dual lens structure has an independent focus to the interlaced image 1550 and to a paired subset of the image (such as one or more image elements). In the microstructure 1530 there is no center lens, which may be useful in some cases such that rays are generally not directed straight up from the assembly 1500 and are better separated from side to side to limit mixing or interference. As discussed above, the image that is viewed may further be enhanced by limiting mixing and enhancing brightness by carefully pairing the image elements of the interlaced image 1550 with the lenses of the microstructure 1530. For example, lenses with similar viewing or direction angles may be used to display the same image element by repeating the image element within the set of images under the microstructure 1530. \

In the illustrated example of FIGS. 15 and 16, the lens set 1530 includes 8 lenses or sublenticules 1510, 1512, 1516, 1518, 1520, 1522, 1526, 1528 provide in 4 dual lens structures 1502, 1504, 1506, 1508. One image element of the interlaced image 1550 is provided underneath or adjacent to each of these lenses or sublenticules. Certain image elements or interlaces are repeated to enhance the displayed image. In the lens set 1530 there are four different direction angles or viewing angles provided $\beta_1$, $\beta_2$, $\beta_3$, and $\beta_4$ and, hence, only four different image elements or interlaces are provided in the interlaced image 1550. Specifically, in this example, lenses 1510 and 1526 have a positive direction angle, $\beta_1$, such as about +30 degrees and are paired with image elements 1552, 1564, which are used to present the same image or interlace of the interlaced image to, thereby, repeat the image portion. Similarly, the negatively sloped lenses 1512, 1528 paired with these lenses 1510, 1526 have substantially equivalent viewing angles, $\beta_2$ such as about −30 degrees, and are paired with image elements 1554, 1566, which are used to present the same image or interlace of the interlaced image to, thereby, repeat the image portion. Continuing this example, lens structures 1504 and 1506 include first lenses 1516, 1520 with substantially equal direction angles, $\beta_3$, such as about +15 degrees and in the assembly 1500 interlaces 1556 and 1560 are paired with these lenses to repeat the display of the corresponding image slice. The second or right lenses 1518, 1522 have substantially equal direction angles, $\beta_4$, such as about −15 degrees and interlaces 1558, 1562, which are similar or identical are paired with these lenses. If the interlaces or image elements are numbered as elements or slices 1 to 4, the image pattern or progression in this assembly 1500 may be 4, 1, 3, 2, 3, 2, 4, 1 to achieve a desirable visual effect. Briefly, to control mixing of different images and to increase overall brightness, the visual display apparatus 1500 uses an interlaced image 1550 with a pattern chosen with repeated image elements or interlaces and these repeated image elements are provided in the pattern so as to be paired with lenses in the dual lens microstructures having similar direction or viewing angles (e.g., like interlaces are distributed at like directions by the microstructure 1530). Hence, in some embodiments, the order of the image elements in the interlaced image 1550 differs from prior interlaced images that simply provided the images sequentially and is configured to match or suit the lens arrangement or order of the microstructure 1530. When viewed, the interlaces may be displayed by element number in an order such as 1, 2, 3, and 4 because image 1 has the greatest deflection to the left, image 2 has the next greatest deflection to the left, image 3 is deflected to the right, and image 4 is deflected further to the right within the overall viewing angle of the microstructure 1530.

Figure 17:
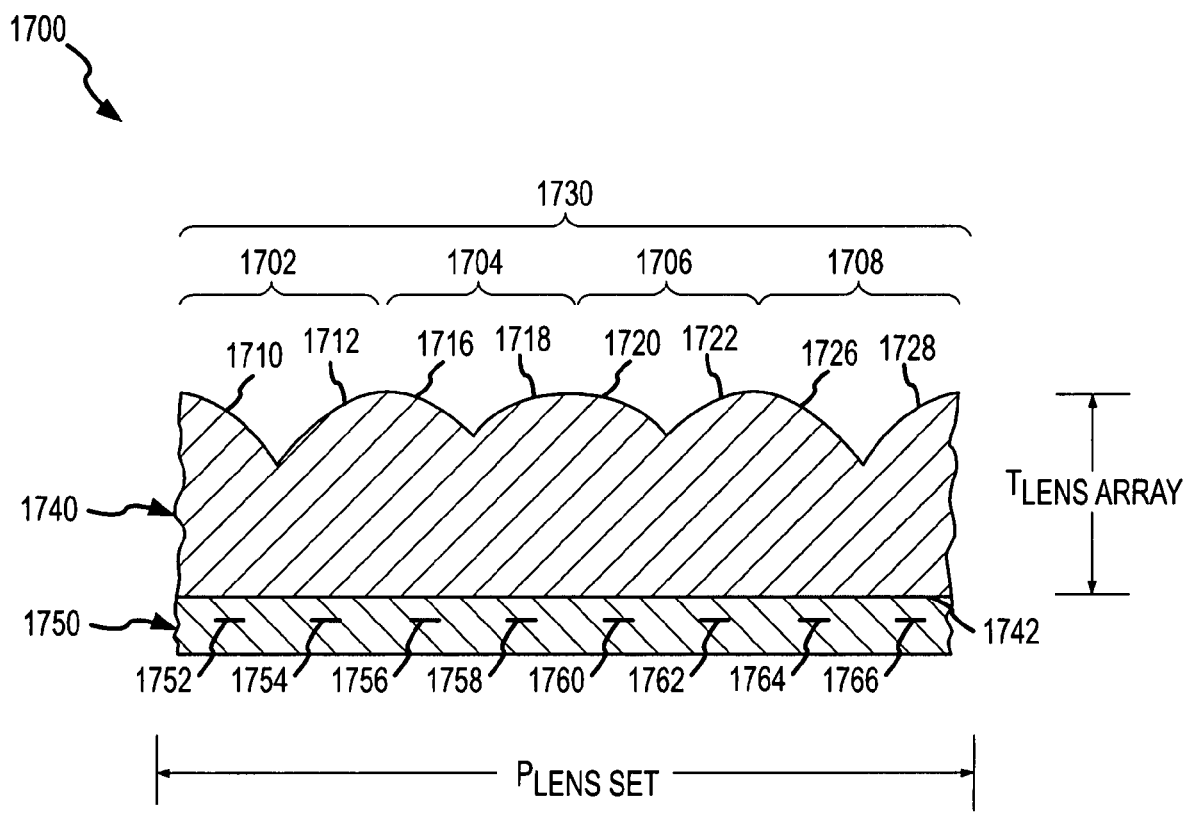
FIG. 17 is a partial, sectional view of an image display assembly including a lens set or lens microstructure formed with the use of a plurality of dual lens structures similar to that shown in FIG. 14 (i.e., formed with 4 of the dual lens structures and 8 lenses or sublenticules in this non-limiting example) for viewing an interlaced image with each lens or sublenticules being paired with a subset of the interlaced images (e.g., one of the image elements or slices)

FIG. 17 illustrates an image display assembly 1700 of an embodiment of the invention formed from one or more lens sets or microstructures 1730 with dual lens structures 1702, 1704, 1706, 1708 (similar to the structure 1400 of FIG. 14) provided in a lens array 1740. The lens array 1740 includes a planar of textured side 1742 bonded to or otherwise attached to an interlaced image layer 1750. Again, the pitch, $P_{Lens\ Set}$, and the lens array thickness, $T_{Lens\ Arrays}$ are typically similar to those described earlier with reference to FIGS. 1-12. Further manufacturing techniques described for other microstructures are applicable to the lens set or microstructure 1730, arrays 1740, and assemblies 1700. The lens set 1730 is similar to that found in microstructure 1530 except that the dual lens structures 1702, 1704, 1706, 1708 are formed with first or left lenses 1710, 1716, 1720, 1726 with negative slopes and second or right lenses 1712, 1718, 1722, 1728 with positive slopes. The lens set 1730 is used to display a set of images in the interlaced image 1750 including image slices or elements 1752, 1754, 1756, 1758, 1760, 1762, 1764, and 1766 that are each paired to an adjacent or overlying lens. In the microstructure 1730, four dual lens structures are again provided with eight lenses or sublenticules. But, of course, the invention can be practiced with differing numbers of dual lens structures such as 1 to 10 or more, and the interlaced image 1750 may have like numbers of interlaces or may have fewer or greater interlaces with the lenses being used to display a subset of such interlaces (e.g., 1, 2, or more of the interlaces or image elements).

Figure 18:
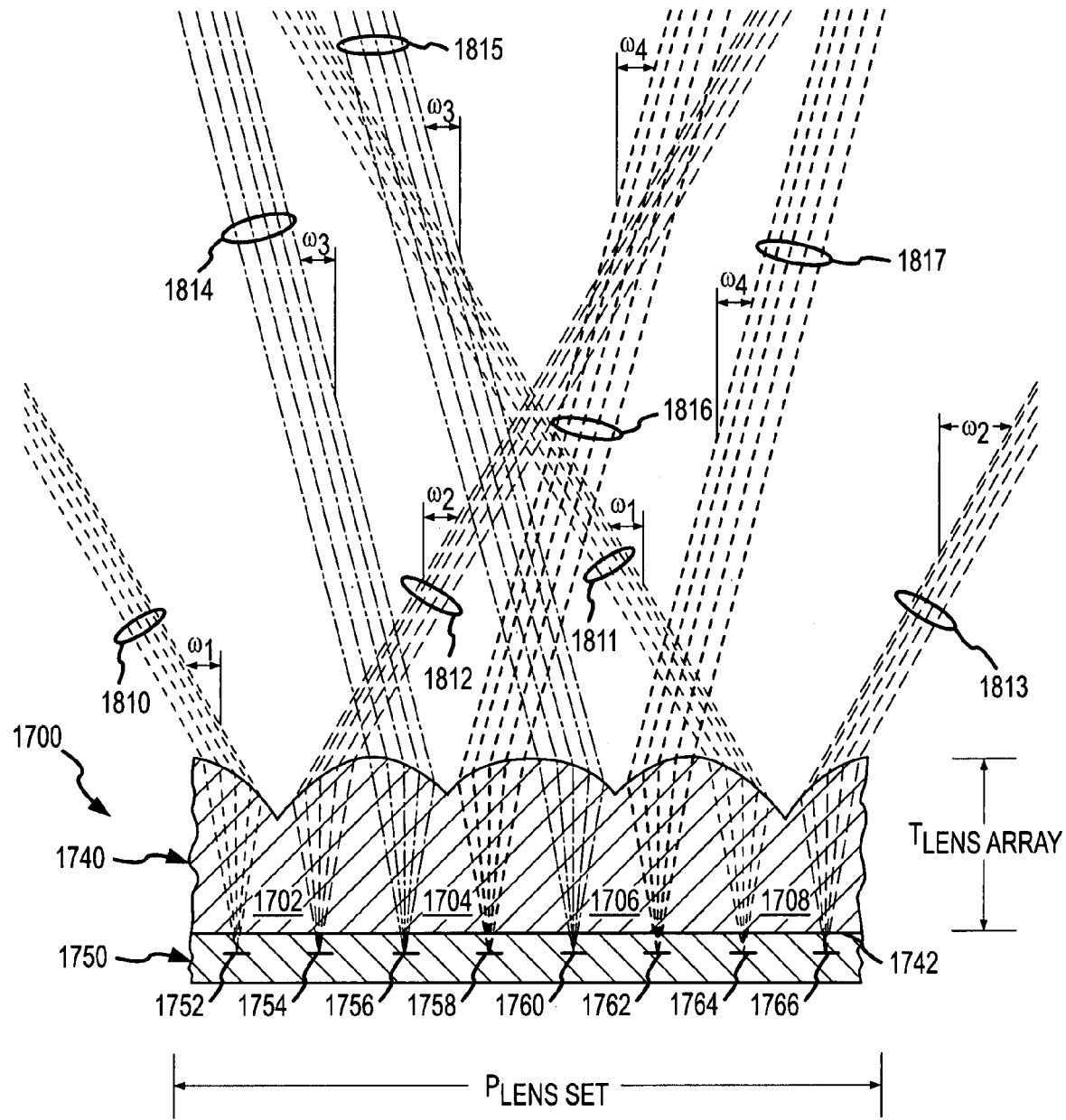
FIG. 18 illustrates a simplified tracing for the image display assembly of FIG. 17 showing the use of one embodiment of dual lens structures to direct or distribute rays from adjacent ones of the image elements or slices in opposite directions (such as a first viewing or direction angle selected from the range of a negative 5 to 45 degrees or the like and a second viewing or direction angle selected from the range of positive 5 to 45 degrees or the like)

FIG. 18 illustrates a ray tracing for the image display apparatus 1700. In the illustrated embodiment first lenses 1710, 1726 of exterior dual lens structures 1702, 1708 have relatively large negative slopes such that they provide ray patterns 1810, 1811 from paired interlaces 1752, 1764 that center about a negative direction angle, $\omega_1$, such as the illustrated −30 degrees from vertical. Second or right lenses 1712, 1728 of these structures 1702, 1708 have equal but positive slopes such that they provide ray patterns 1812, 1813 of paired interlaces 1754, 1766 in the other direction such as patterns centered about a positive direction angle, $\omega_2$, such as illustrated to be about +30 degrees from vertical. The interior or inner dual lens structures 1704, 1706 include first or left lenses have negative slopes such that they provide ray patterns 1714, 1715 from paired interlaces or image elements 1756, 1760 that center about a smaller negative direction angle, $\omega_3$, such as the illustrated −15 degrees from vertical. The second or right lenses or sublenticules of these structures 1704, 1706 have positive slopes such that they provide ray patterns 1816, 1817 from paired interlaces or image elements 1758, 1762 that center about positive direction angles $\omega_4$, such as the illustrated +15 degrees from vertical.

As with apparatus 1500, the display apparatus 1700 may use a unique pattern within the interlaced image 1750 such that like images are paired with lenses with like direction or viewing angles. For example, image elements or interlaces 1752 and 1764 may be the same image slices (or "duplicate" interlaces or image elements) as may be interlaces 1754 and 1766, interlaces 1756 and 1760, and 1758 and 1762. In this manner, the interlaces may be numbered as images 1, 2, 3, and 4 and if it is desired that they be viewable in this order, the pattern in the interlaced image 1750 (or set of images under the microstructure 1730) may be 1, 4, 2, 3, 2, 3, 1, and 4. Again, it should be noted that the number of dual lens structures may be modified to practice the invention as may be their placement in the microstructure (e.g., do not have to have the larger sloped lenses at the exterior or edge points or have the inner and outer lenses having the same slope as it may useful to alternate larger and smaller sloped dual lens structures).

In some configurations of the microstructures formed with dual lens structures, there may be some overlap of images that may decrease the contrast of the effects of motion, 3D imagery, flips, and other desired effects. To examine possible overlap and/or mixing of rays, a brightness plot may be used to examine the effectiveness of a particular microstructure. In a typical brightness plot (such as that may be generated with computer programs), rays from each image passing though a microstructure are summed up in an angular distribution. A figure of merit may also be calculated that takes into account the percentage of rays that are mixed at the various image distribution angles, with a lower figure of merit number representing less mixing. When a brightness plot was run for the display assembly 1500 of FIG. 15 it was found that the figure of merit was 1.233 by plotting the relative intensities of the images in the interlaces versus the angle of view between −45 and +45 degrees. If it was desired to reduce mixing, it may be useful to reduce the number of interlace or slices viewed through the microstructure 1500 such as by removing image 3 (or elements 1556, 1560) from the interlaced image 1550. When the brightness plot was regenerated, the figure of merit was improved to 0.885 (but, of course, with a loss of the information or imagery in the eliminated interlace or slice which may or may not be acceptable to the overall achieved image).

As will be appreciated, the manufacturing techniques described relative to the lens sets of FIG. 6-12 may be utilized with the lens sets using dual lens structures of FIGS. 12-18. Similarly, it may be useful in some applications to provide sidewalls that are substantially straight to assist in fabrication such as use of particular tools as was discussed with reference to FIGS. 6-8. Again, the sidewall or edge (although not shown in FIGS. 15 and 17) may be provided substantially vertically or at a small offset angle. For example, the lens array 1540 of FIG. 15 may be modified such that sidewalls or edges are provided between adjacent ones of the dual lens structures. In one embodiment, a sidewall or edge is provided on the dual lens structures 1504 on lens 1516 proximate to the dual lens structure 1502 and, likewise, a sidewall or edge is provided on the dual lens structure 1506 on lens 1522 proximate to the dual lens structure 1508. In some cases additional sidewalls and/or other modifications may be made to the substantially smooth curves shown for the dual lens structures of arrays 1540 and 1740 to practice the invention.

As noted above, the use of lens sets and microstructures enables excellent visual displays to be generated from interlaced images with much thinner and overall, smaller lens structures. This is also true for lens arrays formed using dual lens structures. For example, the lens sets 1530, 1730 may be formed with a width or pitch, $P_{Lens\ Set}$, that is similar to prior lenticules such as in the range of a few mils up to 20 mils or more. In one preferred embodiment, the pitch, $P_{Lens\ Set}$, is less than 10 mils (e.g., between 7 and 8 mils with 7.2 mil pitch used in one embodiment). This results in a sublenticule or lens pitch of less than a mil (e.g., 7 to 8 mils divided by the number of lenses in the lens set such as the 8 sublenticules shown) such as about 0.9 mils in one embodiment.

The lens array thickness, $T_{Lens\ Array}$, is significantly less than been achievable with conventional lenticular material. It is expected that the lens array thickness may be provided at thicknesses to suit a particular application with some having thicknesses in the 10 to 30 mils range while many others would be provided at thicknesses (or in thin product ranges) of less than 10 mils. For example, useful embodiments of the lens arrays 1540, 1740 may have lens array thickness, $T_{Lens\ Array}$, of less than 5 mils with one modeled array being about 2 mils thick. In the above example of a sublenticule pitch of about 0.9 mils, the ratio of thickness to pitch is about 2.2 (i.e., 2 mils divided by 0.9 mils), which likely will provide useful refraction and avoid issues of total internal reflection that may occur at lower lens to pitch ratios. Again, the lens of the lens set may all be about the same thickness such as a thickness in the range of about 2 to 5 mils or other useful thickness range or, in other cases, the thickness may increase from a first thickness for the interior dual lens structures and increase somewhat for each successive dual lens structure to facilitates fabrication without the use of sidewall or edges. With reference to lens array 1530, for example, the lens array thickness, $T_{Lens\ Array}$, may be 2 mils with each dual lens structure 1502, 1504, 1506, 1508 (and each lens in these structures) being held to less than about 2 mils thickness. In another example, though, the interior dual lens structures 1504, 1506 may have first thicknesses of about 2 mils (or some other first or smaller thickness) while the exterior dual lens structures 1502, 1508 have second thicknesses that are somewhat greater than the first thicknesses such as 2.1 to 2.5 mils or more in this example. The thickness of the dual lens structure (and lens array) being typically measured from the peak of the lens structure (where the two or dual lens meet) to the opposite surface of the array (such as surface 1542 of lens array 1530).

As discussed with reference to dual lens structures and their use in microstructures of the invention, it may be useful to provide flip imagery in which only two images are provided underneath the microstructure, and a viewer can rotate the lens array to "flip" between the two images. In these embodiments, each of the dual lens structures may be configured identically or substantially identically with first and second lenses that have direction or viewing angles of similar magnitude but opposite sign or direction. For example, a microstructure may have one, two, three, four, or more dual lens structures that are configured similarly and have the same pair of interlaces or image elements positioned adjacent them in the interlaced image layer. In one embodiment, this may involve each of the left lenses having a negative slope to provide a positive direction angle while each of the right lenses has a positive slope to provide a negative direction angle, which creates a flip between the paired image elements underneath the microstructure. For example, the angle magnitudes may be 15 to 30 degrees or other useful viewing angles, and in a three dual lens structure embodiment, this may result in viewing angles of +30 degrees, −30 degrees, +30 degrees, −30 degrees, +30 degrees, and −30 degrees when a cross section of a microstructure is viewed from left to right. However, in other embodiments, the dual structures may be more like that shown in FIGS. 17 and 18 with the left lenses having negative viewing angles and right lenses of each microstructure having positive viewing angles. Then, in a 2-microstructure embodiment, the lenses may have viewing angles of −20 degrees, +20 degrees, −20 degrees, +20 degrees (or other angle magnitudes such as angles less than about 60 degrees or the like).

Figure 19:
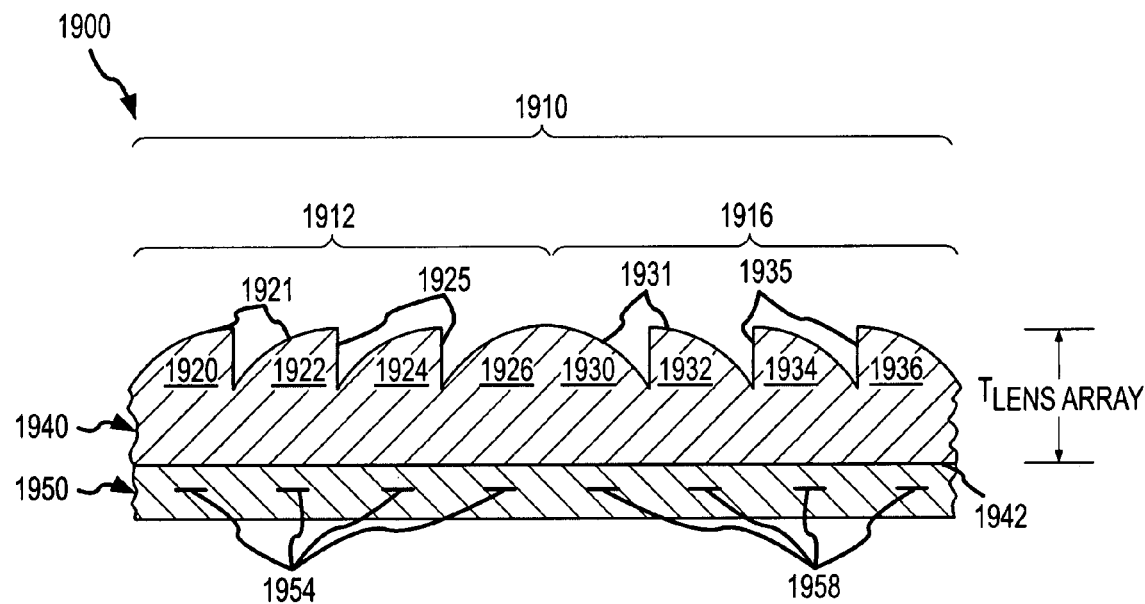
FIG. 19 is a cross section of a flip embodiment of an image display device illustrated with a single a lens microstructure or lens set that would be repeated in the included lens array of the image display device, with the lens microstructure including a first subset of sublenticules or lenses configured for a first viewing or directional angle and a second subset of sublenticules or lenses configured for a second viewing or directional angle having an opposite sign/direction as the first viewing angle.

In other embodiments of the invention, it may be useful to construct lens sets or microstructures for lens arrays that are configured similarly to the lens array 610 of FIG. 6 but that are designed for providing an image flip between two images or the like rather than providing a larger viewing angle made up of incremental steps interlaced images. For example, FIG. 19 illustrates an image display assembly 1900 that may be used in the products and arrays shown in FIGS. 1-5 to allow a viewer to selectively view two images provided in an interlaced image. This is achieved by using a plurality of lens microstructures or lens sets such as lens microstructure 1910 that is formed from first and second lens structures 1912 and 1916 that each provide a particular viewing angle or direction angle and display a single image element or interlace.

To this end, the first lens structure 1912 is formed from one or more lenses or sublenticules that each provide the same or substantially the same viewing angle such as −5 to −60 degrees with direction angles of −20 to −30 degrees being useful in some applications. The second lens structure 1916 is formed from one or more lenses or sublenticules that each provide the same or substantially the same viewing angle that is similar or identical in magnitude as that provided by the first lens structure 1912 but opposite in sign or direction such as +5 to +60 degrees with direction angles of +15 to +30 degrees being useful in some applications.

In the illustrated example, the left or first lens structure 1912 is formed from four lenses or sublenticules 1920, 1922, 1924, 1926 with surfaces 1921 curved to provide substantially the same negative direction angle, (e.g., −15 to −35 degrees or the like with one embodiment using −20 degrees for the first or left viewing angle of the microstructure). Sidewalls or edges 1925 are included, as discussed previously, to assist in fabrication and maintaining a substantially uniform lens array thickness, $T_{Lens\ Array}$. The right or second lens structure 1916 is formed from four lenses or sublenticules 1930, 1932, 1934, 1936 with surfaces 1931 curved or shaped to provide substantially the same positive direction angle (e.g., +15 to +35 degrees or the like with one embodiment using +20 degrees for the second or right viewing angle), which is preferably about the same magnitude but opposite sign or direction as the first or left viewing angle. A lens array 1940 is created in the assembly 1900 by repeating the microstructure 1910 across a surface as discussed relative to FIGS. 1A and 1B. The assembly 1900 is fabricated by printing or attaching an interlaced image layer 1950 to the smooth or textured surface 1942 of the lens array 1940 opposite the lens microstructures 1910.

The interlaced image layer 1950 includes a plurality of image elements (i.e., the interlaced image), with the image elements 1954 being identical or repeating the same image element or slice of the larger image provided in the layer 1950 and the image elements 1958 being identical or repeating. However, image elements 1954 and 1958 differ and when the assembly 1900 is rotated or moved between the viewing direction provided by the first or left lens structure 1912 and the viewing direction or angle provided by the second or right lens structure 1916 the displayed image "flips" from interlaces 1954 to interlaces 1958. The number of lenses included in each lens structure 1912, 1916 may be varied to practice the invention as may be their slope and corresponding viewing or direction angle. Likewise, the slope of the left and right lens structures may be reversed so as to provide a left viewing direction or angle that is positive and a right viewing direction or angle that is negative. The repeating of the images (e.g., four times as shown) decreases the burden associated with printing high resolution interlace patterns associated with conventional thin and fine pitch lenticular material. For example, the complexity or burden may be thought of as being reduced to one fourth by the illustrated implementation. Plots of brightness values has shown that brightness levels are enhanced by the repeating techniques used and has provided improved figures of merit relative to interlaced images in which interlaces or image elements are not repeated.

Figure 20:
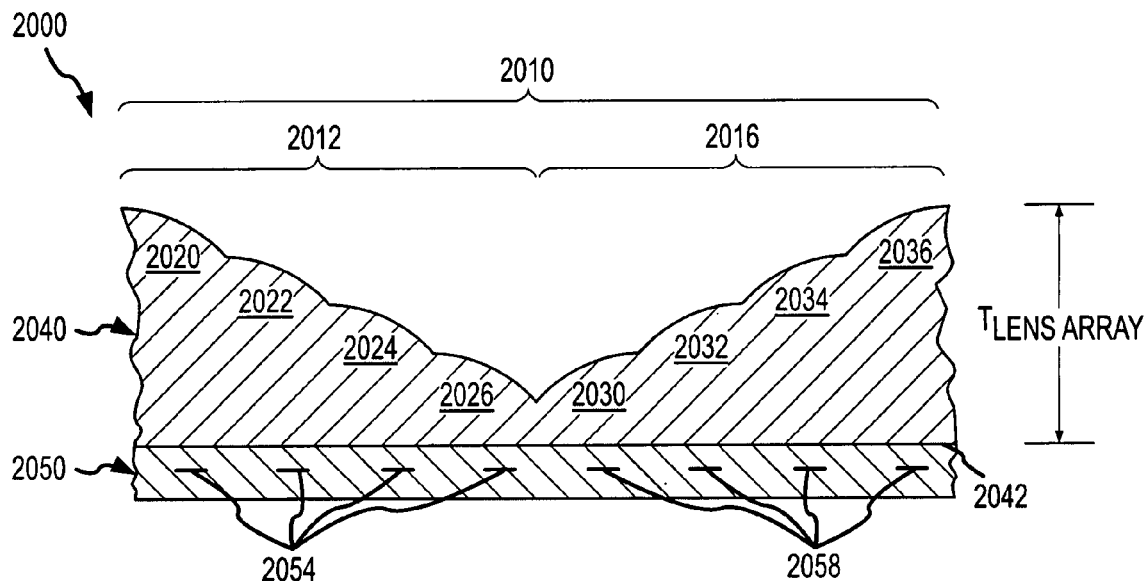
FIG. 20 is a cross section of another flip embodiment of an image display device similar to that shown in FIG. 19 but without a uniform lens thickness (e.g., without edges or sidewalls being provided on the lenses or sublenticules)

In some cases, it may be useful to not place a restraint of uniform lens or sublenticule thickness on the lens sets or lens microstructures of a lens array. FIG. 20 illustrates an image display assembly 2000, with a "flip" type microstructure 2010 similar to that shown in FIG. 19 but with a varying lens thickness. The microstructure 2010 is repeated to form a lens array 2040 with a thickness, $T_{Lens\ Array}$, that is set by the two exterior lenses 2020, 2036. The assembly 2000 includes a smooth or textured mating surface 2042 that abuts the interlaced image layer 2050, which again is configured to repeat a particular image on each side with four similar interlaces 2054 paired with a first or left lens structure 2012 and four similar interlaces 2058 paired with a second or right lens structure 2016. As shown, the lenses 2020, 2022, 2024, 2026 have a similar or even identical negative slopes to provide matching direction angles for distribution of rays from the image elements 2054 such as an angle selected from the range of −5 to −60 degrees and with some embodiments using −15 to −35 degrees.

The lenses 2030, 2032, 2034, 2036 have curved surfaces with positive slopes to provide matching direction angles for distribution of rays from the image elements 2058 such as an angle selected from the range, of +5 to +60 degrees and with some embodiments using an angle of +15 to +35 degrees. Although not required to practice the invention, the direction or viewing angles provided by the two lens structures 2012 and 2016 are typically similar or even identical in magnitude but opposite in sign or direction. For example, the angles may be about −15 degrees and about +15 degrees, about −25 degrees and about +25 degrees, and so on to achieve a desired flip when the lens array 2040 is rotated or a viewer's position is changed. The thickness of the lenses increases in a stepwise manner from the inner lenses 2026, 2030 to the exterior or outer lenses 2020, 2036 to allow the next outer lens to build up from the previous, adjacent inner lens. In this manner, the side edges are not needed to fabricate the microstructure 2010, which simplified fabrication for forming tools, but the thickness of lens array, $T_{Lens\ Array}$, may be greater than that which is achievable with uniform thickness embodiments.

Figure 21:
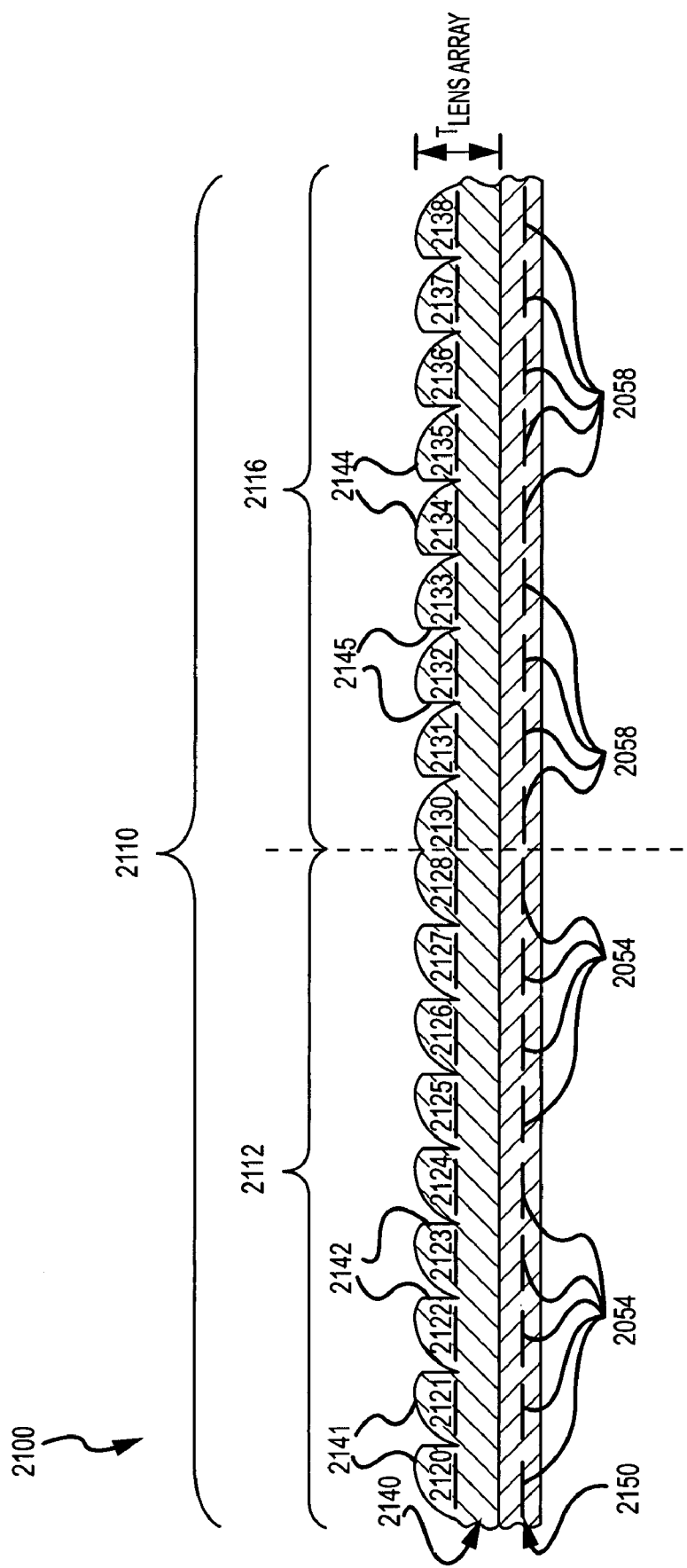
FIG. 21 is a cross section of another flip embodiment of an image display device similar to that shown in FIG. 19 having a greater number of sublenticules or lenses than that of the microstructure of FIG. 19 in each side or flip set of lenses of the lens set or lens microstructure; and showing a groove or valley between the mating, central sublenticules of the lens microstructure.

In some cases, the flip-type lens microstructure may include more or fewer lenses or sublenticules in each side or first and second lens structures. The microstructures 1900 and 2000 are both shown with 4 sublenticules or lenses in the first and second lens structures 1912, 2012 and 1916, 2016, respectively. In other embodiments, the lens structures may have 1 to 3 lenses or sublenticules while in other cases the lens structures may have more than 4 lenses or sublenticules. For example, FIG. 21 illustrates an image display assembly 2100 that may be used in the products and arrays shown in FIGS. 1-5 to provide a flip between first and second images provided by an interlaced image. The assembly 2100 includes a lens microstructure 2110 made up of 18 lenses or sublenticules arranged in first and second (or left and right) lens structures 2112, 2116. The first or left lens structure 2112 is formed from 9 lenses or sublenticules 2120-2128 and, likewise, the second or right lens structure 2116 is formed from 9 lenses or sublenticules 2130-2138. The center pair of sublenticules 2128, 2130 abut each other along one side and slight groove or valley may be formed between their lens or light-receiving surfaces. The lens microstructure 2110 would be repeated across the surface of a lens array 2140, as discussed previously, with the lens array 2140 mated with an interlaced image layer 2150.

The lenses of each lens structure 2112, 2116 include surfaces 2141, 2145 shaped to provide an identical or at least similar viewing direction or angle (e.g., within an acceptable tolerance range such as within 1 to 5 degrees or the like). The interlaced image of layer 2150 is designed or arranged such that 9 like images 2054 are paired with the lenses 2120-2128 of the left or first lens structures and 9 like images 2058 (but different than images 2054) are paired with the lenses 2130-2138. Such that the assembly 2100 acts to "flip" the produced display or imagery between the two images 2054, 2058 when the observer moves or the assembly 2100 is rotated or moved. Again, the thickness, $T_{Lens\ Array}$, of the lens array 2140 would be significantly less than achievable for a conventional lenticule that is replaced by the lens microstructure 2110 and would likely be in the ranges provided for other lens arrays of described above. For example, the thickness, $T_{Lens\ Array}$, may be less than about 20 mils, more preferably less than about 15 mils, and even more typically less than about 5 mils with one embodiment using a uniform thickness of about 1 mils of lens material. The thickness, $T_{Lens\ Array}$, may be held substantially constant as shown by including sidewalls or edges 2142, 2144 between adjacent pairs of sublenticules in the lens structures 2112, 2116. However, in other cases, the sidewalls are not provided and the lens array thickness may vary between the sublenticules such as shown in FIG. 20.

Figure 22:
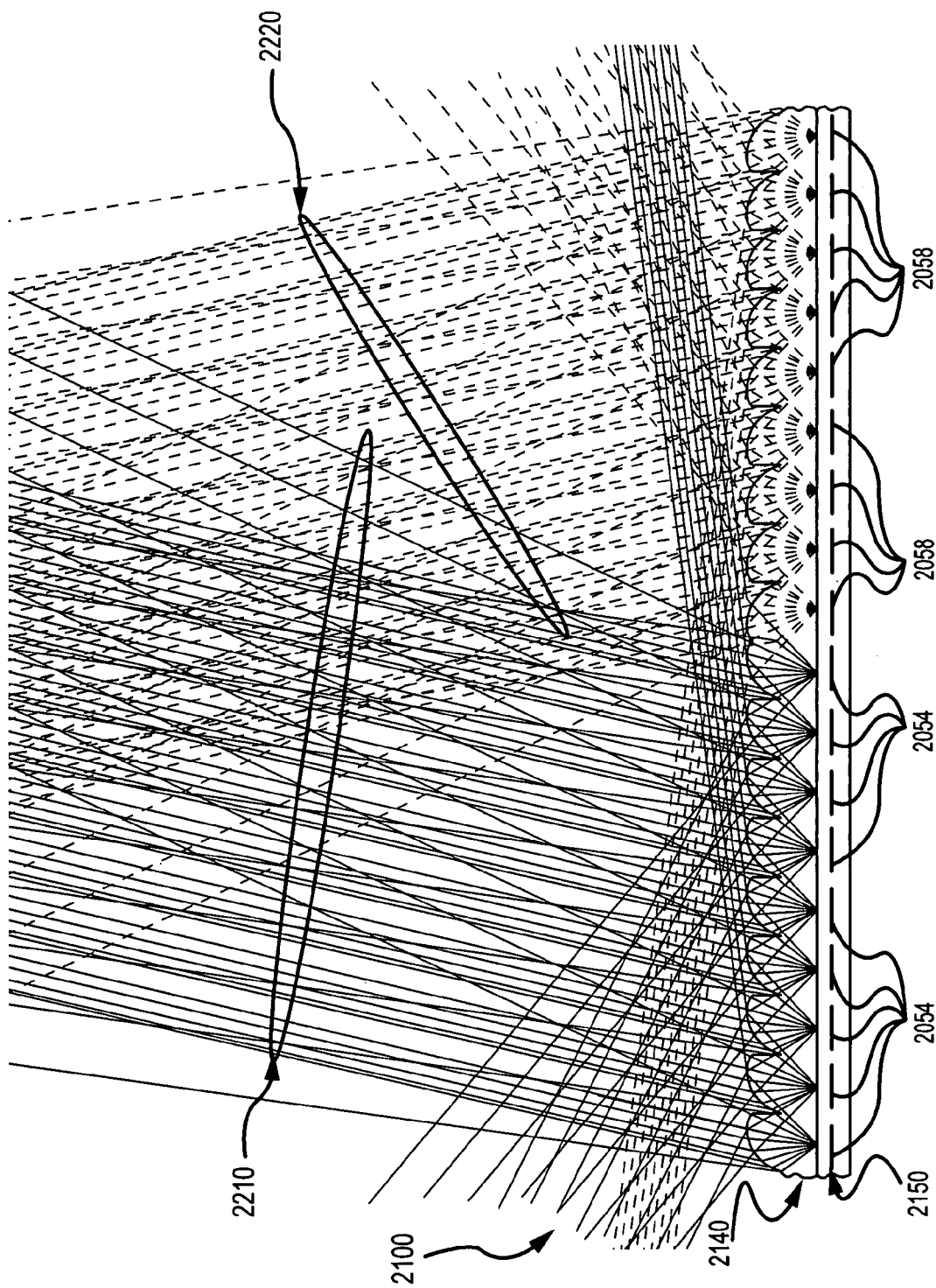
FIG. 22 illustrates a ray tracing for the lens microstructure of FIG. 21 illustrating first and second viewing angles followed by rays from the two side subsets of sublenticules in the lens set or lens microstructure to create a flip effect.

FIG. 22 illustrates a ray tracing for use of the image display assembly 2100 in viewing an interlaced image 2150 by flipping between images associated with a first set of interlaces 2054 and a second set of interlaces 2058 (which each represent only a fraction of a larger image). The rays 2210 from the lenses 2120-2128 of the left lens structure 2112 are directed at a first viewing or direction angle while the rays 2220 from the lenses 2130-2138 are directed at a second viewing or direction angle. The first and second direction angles are typically similar or identical in magnitude but opposite in sign or direction. For example the first direction angle may be a positive angle selected from the range of 5 to 60 degrees or the like with an angle of 25 to 35 degrees being used in some cases while the second direction angle is a negative angle selected from the range of −5 to −60 degrees or the like with an angle of between about −25' and −35 degrees used in some cases. Typically, both angles are similar in magnitude (such as one being +30 degrees while the other is −30 degree as measured from a vertical plane passing through the sublenticules). As shown, each of the sublenticules in the lens structure 2112 directs rays from the paired interlaces below or adjacent in substantially identical directions such that the rays 2210 are made up of a plurality of parallel rays. Similarly, the sublenticules in the lens structure 2116 direct rays from the paired interlaces below or adjacent in substantially identical directions such that the rays 2220 are made up of a plurality of parallel rays (with a direction or angle that is similar in magnitude as the rays 2210 but opposite in sign or direction). This results in a "flip" between a pair of images in the interlaced image 2150 with enhanced brightness and clarity when compared with conventional lenticule arrays. The direction or viewing angles of the microstructures 2112, 2116 may be reversed in some cases to practice the invention.

PROGRAM LISTING FOR LENS MICROSTRUCTURE GENERATION/CONFIGURATION

```
tol1 = 0.0001 'tolerance for completing loop.
'yy1 is starting y value
icount = 0
nummissed = 0
pitchsub = PitchOverAll/CDbl(NumberSubLenticules)
    n = 0 'start at center to get height of endpoints to use as starting points for slant walls
        'each lenticule uses the previous sidewall height as a starting point.
    thicknesstemp = Thickness 'the temporary thickness is initially set to the desired thickness
'it will be changed if the thickness tolerance is exceeded and the entire calculation will be
repeated until the desired thickness is met.
        i = 0 'center spline knot of the nth sub lenticule (in this section n = 0 and the center
lenticule is calculated)
        X(n, i) = (XLenticuleEnd(n) + XLenticuleEnd(n + 1))/2# 'start at center of a lenticule
        Y(n, i) = thicknesstemp 'go from the center and work out to the ends of the lenticule
        'left hand side of center lenticule
        XDelta = -DelX 'step size of knots.
            While X(n, i) > (XLenticuleEnd(n) + tol1)
            s1 = X(n, i)
            yy1 = Y(n, i)
            i = i - 1
            X(n, i) = s1 - DelX
            xx = X(n, i)
'the values of the y starting position, x position, and step size to be taken for sublenticule n are
passed to a subroutine which will calculate the y position for the next x location
            Call YCoOrdinateFind2(n, XDelta, xx, yy1, yy2, Flag)
            End If
            If Flag = True Then
                Y(n, i) = yy2
            End If
        Wend
    NumPtsLenLeft(n) = i ' the knot for the left hand side of lenticule n is saved.
    'The right hand side of center lenticule is calculated in a similar fashion
*
Etc
*
End If
        NumPtsLenRight(n) = i
'*********************************************
    'now do the left side lenticules using the center lenticule end points in sidewall sub.
    For n = 1 To LenNumLeft Step -1
        thicknesstemp = Thickness
GL100:
    i = 0
    X(n, i) = (XLenticuleEnd(n) + XLenticuleEnd(n + 1))/2# 'start at center of lenticule n
    Y(n, i) = thicknesstemp 'go from the center and work out to the ends of the lenticule
    'left hand side of lenticule
    XDelta = -DelX
    While X(n, i) > (XLenticuleEnd(n) + tol1)
        s1 = X(n, i)
        yy1 = Y(n, i)
        i = i - 1
        X(n, i) = s1 - DelX
        xx = X(n, i)
        Call YCoOrdinateFind2(n, XDelta, xx, yy1, yy2, Flag)
        Y(n, i) = yy2
        If Y(n, i) > Thickness Then 'get the adjustment to keep the thickness uniform
            If Y(n, i) > thicknessmax Then
                thicknessmax = Y(n, i)
            End If
        End If
        Else
'if the case total internal reflection (TIR) was obtained the slope is calculated in the TIR sub.
        Call Generate_Lenticule_TIR_End("Left", n, i, xx, yy1)
            nummissed = nummissed + 1
        End If
        Call Generate_Lenticule_Sidewall_Intersect"Left", n, i, flagslant) 'intersect possibly
sloping side wall
    Wend
    NumPtsLenLeft(n) = i
```

-continued

PROGRAM LISTING FOR LENS MICROSTRUCTURE GENERATION/CONFIGURATION

```
The right hand side calculation proceeds in a similar manner except for sign change of Xdelta.
'Here is where the resulting maximum thickness is compared to desired thickness
      If (thicknessmax − Thickness) > 0.00001 * Thickness Then
         thicknesstemp = 2# * Thickness − thicknessmax
         thicknessmax = 0#
         GoTo GL100 'start over because maximum thickness was larger than desired
      End If
      NumPtsLenRight(n) = i
   Next n
   LenticulesGenerated = True
'for no side walls, start at the center and start each lenticule at the endpoint of the previous
lenticule
If SideWalls = "None" Then
   XDelta = DelX
   X(0, 0) = 0# 'start at center
   s1 = −DelX
   For n = 0 To LenNumRight
      i = 0
      If n = 0 And i = 0 Then
         Y(n, i) = Thickness
      Else
         Y(n, i) = Y((n − 1), NumPtsLenRight(n − 1)) 'start the new lenticule y at the end
y of previous lenticule
         X(n, i) = XLenticuleEnd(n)
      End If
      NumPtsLenLeft(n) = i
      While X(n, i) < (XLenticuleEnd(n + 1) − XDelta + tol1)
         yy1 = Y(n, i) 'starting height of element
         s1 = s1 + DelX
         i = i + 1
         X(n, i) = s1 + DelX 'x position of next element
         xx = X(n, i)
         Call YCoOrdinateFind2(n, XDelta, xx, yy1, yy2, Flag)
         If Flag = True Then
            Y(n, i) = yy2
            Else
            nummissed = nummissed + 1
         End If
      Wend
      NumPtsLenRight(n) = i
   Next n
'mirror the center lenticule (only half was done above)
   For i = 0 To NumPtsLenRight(0)
      j = −i
      X(0, j) = −X(0, 1)
      Y(0, j) = Y(0, i)
   Next i
   NumPtsLenLeft(0) = −NumPtsLenRight(0)
'mirror the lenticules (the center is 0 and left alone)
   For n = 1 To LenNumRight
      k = −n
      For i = NumPtsLenLeft(n) To NumPtsLenRight(n)
         j = −i
         X(k, j) = −X(n, i)
         Y(k, j) = Y(n, i)
      Next i
      NumPtsLenRight(k) = NumPtsLenLeft(n)
      NumPtsLenLeft(k) = −NumPtsLenRight(n)
   Next n
   LenticulesGenerated = True
   If nummissed > 0 Then
      MsgBox ("Number of missed points was " & nummissed)
      Exit Sub
   End If
End If
End Sub
'the sub that calculates the y position based on the desired ray direction and given x location in
the sub lenticule is below
Sub YCoOrdinateFind2(n, XDelta, xx, yy1, yy2, Flag)
'variable declarations are omitted for brevity
Flag = False
'start a course angle step and when the difference is no longer decreasing, back off and start a
smaller
```

-continued

PROGRAM LISTING FOR LENS MICROSTRUCTURE GENERATION/CONFIGURATION

```
'step size close by. Keep doing this until deltheta reaches a very small value.
xs = XInterlaceCenter(n)     'points for start of ray to be traced
ys = 0#
zs = 0#
'diff = 100000 'initialize the difference
k = 0
halfdelx = XDelta/2#
xint = (xx − halfdelx)
zint = 0#
theta = −1.51 ' (radians = −85.6 degrees)
deltheta = 0.001
diffmax = 100# 'starting point
While deltheta > 0.00000000001
   k = k + 1
   theta = theta + deltheta
   If Abs(theta) > 1.51 Then 'get out of loop, no angle was found to satisfy the ray direction
requirement
        Exit Sub
   End If
   dely = halfdelx * Tan(theta)
   yint = (yy1 + dely) 'center of line segment under consideration
   s1 = Sqr((xint − xs) ^ 2 + (yint − ys) ^ 2 + (zint − zs) ^ 2)
   e1x = (xint − xs)/s1         'direction cosines of ray to be traced
   e1y = (yint − ys)/s1
   e1z = (zint − zs)/s1
   xp = xint     'points on the plane perpendicular to line segment
   yp = yint
   zp = zint
   'normal to plane
   enx = −Sin(theta)
   eny = Cos(theta)
   enz = 0#
   Call intplane(xs, ys, zs, e1x, e1y, e1z, xp, yp, zp, enx, eny, enz, xi, yi, zi, intflag)
   If intflag = False Then
       MsgBox ("intplane returned no intersection in Ycoordinate2Find")
   End If
   an1 = IndexLenticule
   an2 = IndexAir
   Call refract(an1, an2, e1x, e1y, e1z, enx, eny, enz, e2x, e2y, e2z, iflag)
   If iflag = 3 Then '(TIR)
      diffmax = 100#
   End If
   If iflag = 2 Then '( refraction )
      s10 = e2x − Sin(AngleLenticule(n))
      diff = Abs(s10)
      If diff < diffmax Then
         diffmax = diff
         Else                            'if past minimum, back off and make smaller steps
         theta = theta − 2# * deltheta   'back off angle
         deltheta = deltheta/3#          'decrease steps
         diffmax = 100#                  ' get a new starting point
      End If
   End If
Wend
'check limit for slope (needed to prevent tool from clipping sharp point of sidewall and steepest
slope.
If SideWalls = "Hybrid" Then
   If Abs(theta) > ThetaSlopeLimitRadians Then
      If theta >= 0 Then
         theta = ThetaSlopeLimitRadians
         Else
         theta = −ThetaSlopeLimitRadians
      End If
      dely = halfdelx * Tan(theta)
   End If
End If
yy2 = yy1 + 2# * dely
If k < 2 Then
   MsgBox ('YCoordinatefind K < 2 (starting point of yy2 is not small enough.) xx=" & xx & "
yy1= " & yy1)
   Exit Sub
End If
Flag = True
End Sub
```

We claim:

1. An assembly for displaying an interlaced image, comprising:
   an interlaced image comprising sets of elongate image elements; and
   a lens array comprising a first side proximate the interlaced image and a second side comprising a plurality of lens sets, wherein each of the lens sets is paired with one of the sets of the image elements and each of the lens sets comprises a plurality of elongate lenses that are each mapped to a subset of the image elements in the corresponding paired set of the image elements and that are arranged in adjacent pairs to form a plurality of dual lens structures.

2. The assembly of claim 1, wherein each of the lenses of each of the lens sets is configured to focus light from one of the image elements in the mapped subset.

3. The assembly of claim 1, wherein in each of the dual lens structures a first one of the adjacent pair of elongate lenses is adapted to provide a first viewing angle relative to a perpendicular plane passing through the dual lens structure and a second one of the adjacent pair of elongate lenses is adapted to provide a second viewing angle relative to the perpendicular plane that is in the opposite direction relative to the perpendicular plane than the first viewing angle.

4. The assembly of claim 3, wherein the first and second viewing angles are substantially equal in magnitude.

5. The assembly of claim 4, wherein the magnitude is selected from the range of about 5 to about 60 degrees.

6. The assembly of claim 4, wherein at least two of the dual structures have substantially equivalent cross sectional shapes to provide substantially equivalent first and second viewing angles and wherein each of the subsets of the image elements comprises at least two pairs of repeated ones of the image elements that are paired with the elongate lenses of the at least two of the dual structures.

7. The assembly of claim 1, wherein the lens array has a thickness of less than about 15 mils and each of the lens sets has a pitch of less than about 20 mils.

8. The assembly, of claim 7, wherein the lens array has a thickness of less than about 5 mils.

9. An image display apparatus, comprising:
   an interlaced image comprising a plurality of image elements each having a predefined width; and
   a lens substrate with a planar side proximate to the interlaced image and a lens side opposite the planar side, wherein the lens side comprises a plurality of lens microstructures each comprising a plurality of lenses that are each paired to one of the image elements to focus light passing through the lens substrate to about the predefined width and onto the paired one of the image elements, the lenses in each of the lens microstructures being arranged in dual lens structures comprising a first lens and second lens each distributing light from the paired one of the image elements at first and second viewing angles having equal magnitude but opposite sign as measured from a plane passing between the first and second lenses.

10. The apparatus of claim 9, wherein the magnitude of the first and second viewing angles differ for at least some of the dual lens structures.

11. The apparatus of claim 10, wherein the magnitude of the first and second viewing angles is equivalent for at least some of the dual lens structures and for the equivalent dual lens structures the paired image elements are substantially identical in content.

12. The apparatus of claim 10, wherein the dual lens structures are arranged based on the magnitude of the first and second viewing angles such that dual lens structures with larger ones of the magnitude are positioned as the outer structures of the lens microstructure.

13. The apparatus of claim 12, wherein the image elements under each lens microstructure include a set of interlaces for viewing in a particular sequence and wherein the set of interlaces are paired with the lenses for the dual lens structures in order from a largest magnitude negative viewing angle to a largest magnitude positive viewing angle, whereby light is reflected from the set of interlaces in the particular sequence.

14. The assembly of claim 9, wherein the lens array has a thickness of less than about 10 mils.

15. An image display assembly comprising:
   an interlaced image including sets of image slices, comprising:
   a lens array comprising a substrate of a material that is at least translucent to light and with a first surface adjacent the interlaced image and a second surface comprising a plurality of lens microstructures, wherein each lens microstructure comprises:
      a first set of elongate lenses, wherein the lenses of the first set each have a first focus direction at a first angle relative to a plane perpendicular to the lens microstructure; and
      a second set of elongate lenses positioned adjacent the first set of elongate lenses and extending parallel to the extending parallel to the first set of elongate lenses, wherein the lenses of the second set each have a second focus direction at a second angle relative to a plane perpendicular to the lens microstructure that differs from the first angle;
   wherein each set of the image slices is paired with one of the lens microstructures.

16. The image display assembly of claim 15, wherein each set of the images slices comprises a first set of identical image elements and a second set of identical image elements and wherein each of the lenses of the first set of elongate lenses focuses on one of the first set of identical image elements and each of the lenses second set of elongate lenses focuses on one of the second set of identical image elements.

17. The image display assembly of claim 15, wherein the first and second angles are equal in magnitude but differ in sign relative to a plane perpendicular to the lens microstructure.

18. The image display assembly of claim 17, wherein the first angle is selected from the range of −5 to 45 degrees or from the range of +5 to +45 degrees.

19. The image display assembly of claim 15, wherein the number of elongate lenses in the first set equals the number of elongate lenses in the second set and wherein the number of elongate lenses in the first set is less than 10 lenses.

20. The image display assembly of claim 15, wherein the lens array has a substantially uniform thickness of less than about 15 mils.

21. The image display assembly of claim 20, wherein the thickness of the lens array is less than about 5 mils.

22. The image display assembly of claim 21, wherein the thickness of the lens array is about 1 mils.

* * * * *

UNITED STATES PATENT AND TRADEMARK OFFICE
CERTIFICATE OF CORRECTION

PATENT NO. : 7,414,790 B1 Page 1 of 1
APPLICATION NO. : 11/838045
DATED : August 19, 2008
INVENTOR(S) : Raymond et al.

It is certified that error appears in the above-identified patent and that said Letters Patent is hereby corrected as shown below:

Column 48, line 44, after the first occurrence of "lenses", insert -- of the --.
Column 48, line 51, delete "45", and insert therefor -- -45 --.

Signed and Sealed this

Eleventh Day of November, 2008

JON W. DUDAS
*Director of the United States Patent and Trademark Office*